(12) United States Patent
Nakahara et al.

(10) Patent No.: US 12,496,649 B2
(45) Date of Patent: Dec. 16, 2025

(54) METHOD AND DEVICE FOR PRODUCING FRAME STRUCTURE

(71) Applicant: KABUSHIKI KAISHA KOBE SEIKO SHO (KOBE STEEL, LTD.), Kobe (JP)

(72) Inventors: Takumi Nakahara, Yamaguchi (JP); Taiki Yamakawa, Yamaguchi (JP); Yuki Fujita, Yamaguchi (JP); Chieko Imai, Kanagawa (JP); Yoshihaya Imamura, Tokyo (JP)

(73) Assignee: KOBE STEEL, LTD., Kobe (JP)

( * ) Notice: Subject to any disclaimer, the term of this patent is extended or adjusted under 35 U.S.C. 154(b) by 0 days.

(21) Appl. No.: 18/699,369

(22) PCT Filed: Sep. 22, 2022

(86) PCT No.: PCT/JP2022/035537
§ 371 (c)(1),
(2) Date: Apr. 8, 2024

(87) PCT Pub. No.: WO2023/063054
PCT Pub. Date: Apr. 20, 2023

(65) Prior Publication Data
US 2024/0408688 A1    Dec. 12, 2024

(30) Foreign Application Priority Data
Oct. 15, 2021 (JP) .................................. 2021-169697

(51) Int. Cl.
B23K 9/02 (2006.01)

(52) U.S. Cl.
CPC ...................................... B23K 9/02 (2013.01)

(58) Field of Classification Search
CPC .......... B23K 9/02; B23K 31/00; B23K 37/04; B23K 9/00
See application file for complete search history.

(56) References Cited

FOREIGN PATENT DOCUMENTS

| JP | 4-313496 | | 11/1992 |
| JP | 08164491 A | * | 6/1996 |
| JP | 8-332566 A | | 12/1996 |
| JP | 2588698 Y2 | | 1/1999 |
| JP | 2001-239978 A | | 9/2001 |
| JP | 2005-66668 A | | 3/2005 |

OTHER PUBLICATIONS

Nakamura S, JP-08164491-A Machine translation (Year: 1996).*

* cited by examiner

Primary Examiner — Lee A Holly
(74) Attorney, Agent, or Firm — Oblon, McClelland, Maier & Neustadt, L.L.P.

(57) ABSTRACT

Provided are a method and a device for producing a frame structure, in which influences of both a thermal distortion due to welding and a decrease in the accuracy of the frame member itself are eliminated and high geometrical accuracy is obtained. The method for producing a frame structure includes supporting both ends of a long frame member, temporarily fixing a connecting member to somewhere along a longitudinal direction of the frame member, and final-welding the connecting member to the frame member while keeping the frame member in an elastically deformed state by imposing a bending load on an intermediate portion along the longitudinal direction of the frame member.

18 Claims, 23 Drawing Sheets

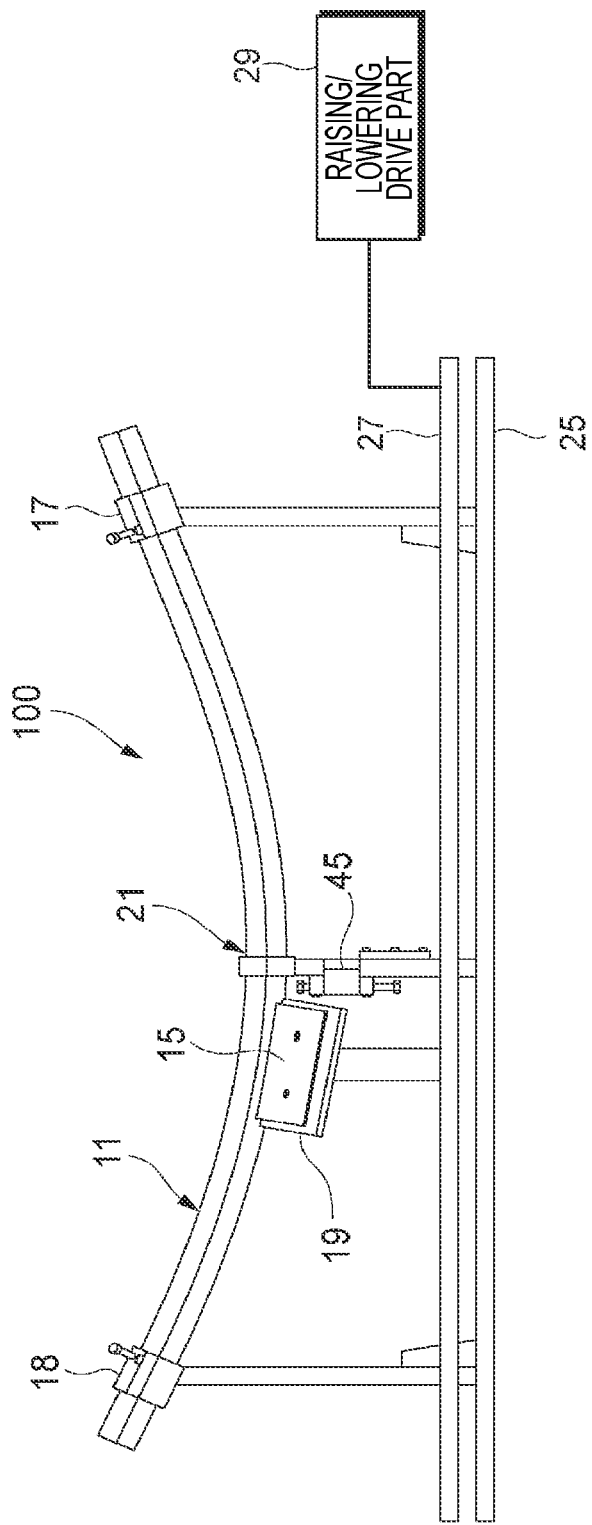

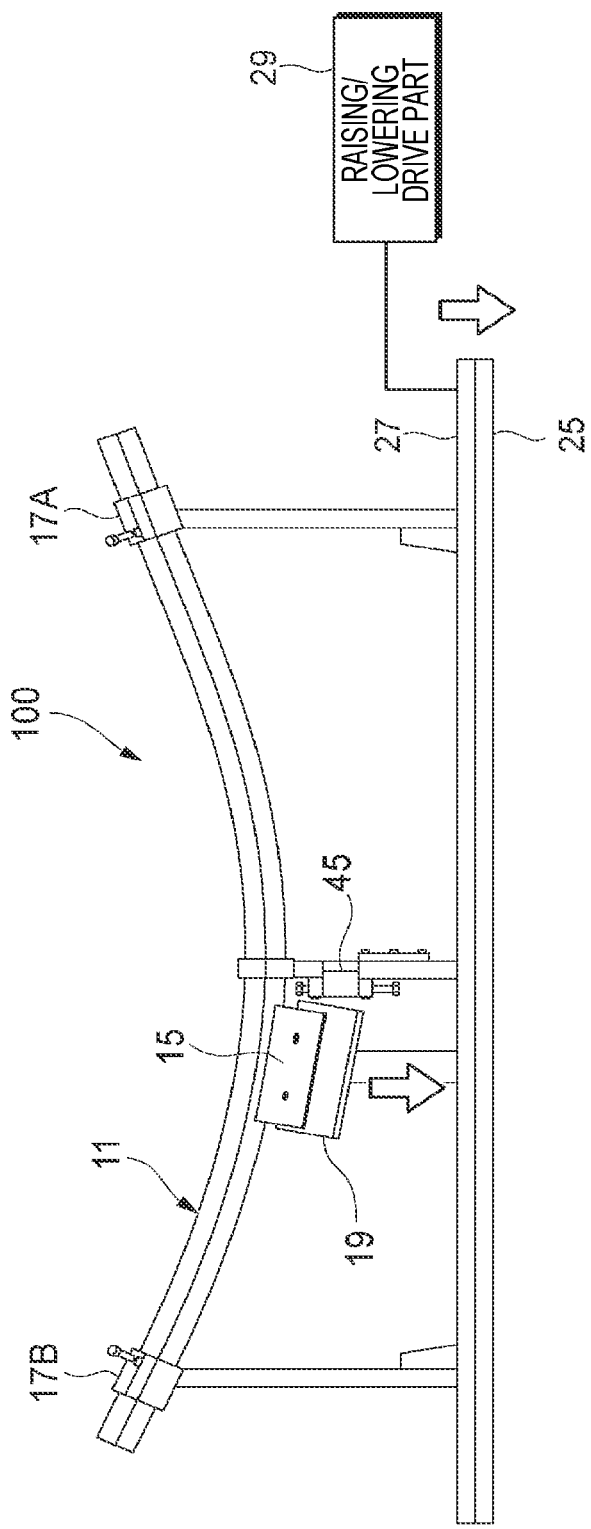

ns as designed after connecting members have been joined thereto.

METHOD AND DEVICE FOR PRODUCING FRAME STRUCTURE

TECHNICAL FIELD

The present invention relates to a method and a device for producing a frame structure.

BACKGROUND ART

Frame structures for use in vehicles, various industrial machines, etc. are frequently produced by providing some of a frame member with connecting members, e.g., brackets, for connection to other members or to the main bodies of, for example, vehicles. Not only connecting members are provided to a linear portion of a frame member but also in the case of a frame member which has undergone bending, connecting members are sometimes provided to the bent portion or to the vicinity thereof. Since the connecting members are to be joined, with high accuracy, to an object to which the frame structure is to be assembled, it is necessary to attach the connecting members to the frame member so as to attain a given degree of geometrical positional accuracy with respect to the members to be connected thereto.

As a means for attaching such connecting members, there is a method in which the connecting members are attached to a frame member with a mechanical joining means, e.g., bolts (Patent Document 1). In this method, the positions where the connecting members are to be attached can be regulated, for example, by forming attachment holes having, for example, an elongated shape, making it easy to regulate the accuracy of attachment portions for the connecting members.

The method, however, has drawbacks in that the method necessitates an increased number of steps including holing and that the connecting-member attachment portions include a larger number of components due to the use of bolts or the like, resulting in an increase in the overall weight of the frame structure.

As a means for overcoming these drawbacks, there are techniques in which connecting members are attached to a frame member by welding (Patent Documents 2 and 3). Since these techniques can join brackets to a frame member without causing an increase in the number of components, the frame structure is inhibited from having an increased weight.

CITATION LIST

Patent Literature

Patent Document 1: Japanese Utility Model Registration No. 2588698
Patent Document 2: JP2005-066668A
Patent Document 3: JP2001-239978A

SUMMARY OF INVENTION

Technical Problems

However, in the attachment by welding, the joining surfaces of the connecting members deform due to a thermal distortion during welding and it is hence difficult to ensure the geometrical positional accuracy with respect to members to be joined to the connecting members. In addition, for example, in the case of a frame member having a bent portion, bending is generally conducted using a press, a bender (a finishing machine for push bending, pull bending, or mandrel bending), or the like and it is necessary to perform shape correction for obtaining dimensional accuracy in the bending. This shape correction tends to result in a large deformation amount to cause the member to undergo spring back. It is hence difficult to make the frame member itself have an accuracy within a given range. In the case of a linear frame member also, delicate shape correction is necessary for making the frame member retain the straightness as designed after connecting members have been joined thereto.

That is, in the case of a frame member to which fixing members have been joined by welding, it is needed to control both a decrease in geometrical accuracy by a thermal distortion due to welding and a decrease in the geometrical accuracy (or unevenness in shape correction) of the frame member itself. However, a method for frame structure production which simultaneously overcomes the two problems has not been obtained so far.

An object of the present invention is to provide a method and a device for producing a frame structure, in which influences of both a thermal distortion due to welding and a decrease in the accuracy of the frame member itself are eliminated and high geometrical accuracy is obtained.

Solution to the Problems

The present invention includes the following configurations.
(1) A method for producing a frame structure, the method including
  supporting both ends of a long frame member,
  temporarily fixing a connecting member to somewhere along an axial direction of the frame member, and
  final-welding the connecting member to the frame member while keeping the frame member in an elastically deformed state by imposing a bending load on an axial-direction intermediate portion of the frame member.
(2) A device for producing a frame member, the device including
  both-ends-supporting parts for supporting both ends of a long frame member,
  a stand for disposing thereon a connecting member somewhere in a longitudinal direction of the frame member so that the connecting member faces the frame member and for temporarily fixing the connecting member to the frame member,
  a frame-bending part which imposes a bending load on an intermediate portion along the longitudinal direction of the frame member to elastically deform the frame member, and
  a welding part which final-welds the temporarily fixed connecting member to the frame member.

Advantageous Effect of Invention

According to the present invention, influences of both a thermal distortion due to welding and a decrease in the accuracy of the frame member itself are eliminated and a frame member having high geometrical accuracy is obtained.

BRIEF DESCRIPTION OF DRAWINGS

FIG. 6A is a front view of the production device, the view showing an initial state of an upper base plate.

FIG. 6B is a front view of the production device, the view showing the upper base plate in the state of having been lowered toward a lower base plate.

DESCRIPTION OF EMBODIMENTS

Embodiments of the present invention are described in detail below using the drawings for reference.

Here, a frame structure for use in the ladder frame, roof frame, or the like of a vehicle is explained as an example, but objects to which the frame structure is applicable and the shape of the frame structure are not limited to these.

<Frame Structure>

Figure 1:
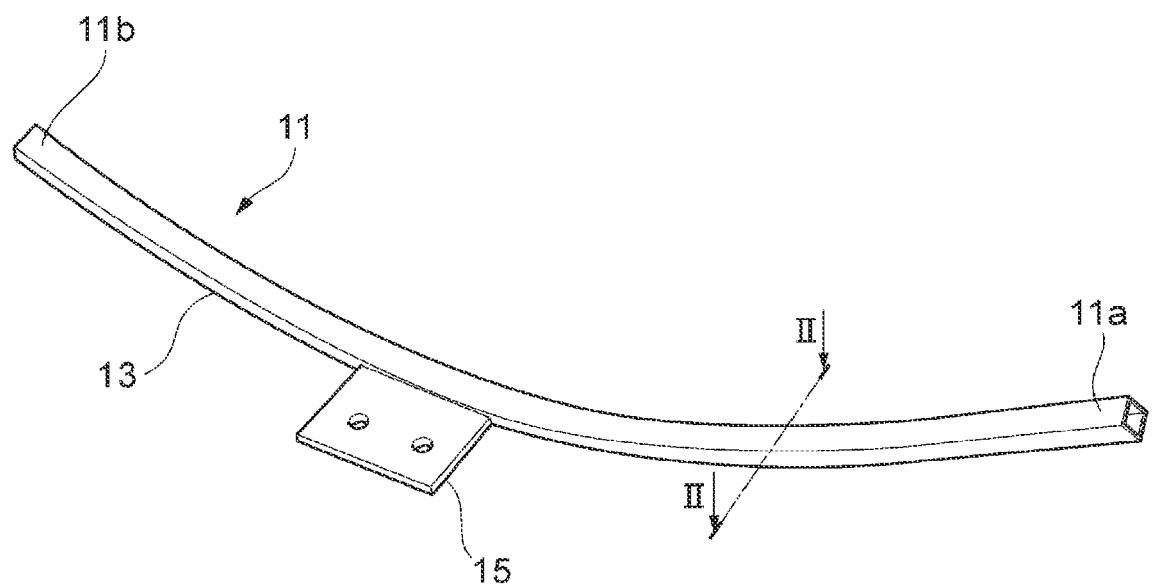
FIG. 1 is a slant view illustrating a frame structure.
Figure 2:
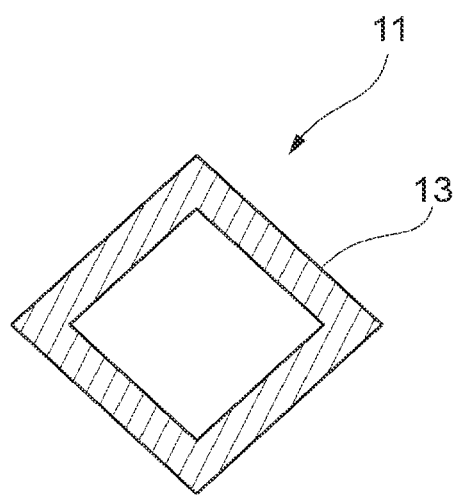
FIG. 2 is a cross-sectional view of the frame member cut along the line II-II of FIG. 1.

FIG. 1 is a slant view illustrating a frame structure 11. FIG. 2 is a cross-sectional view of the frame member cut along the line II-II of FIG. 1.

The frame structure 11 includes a long frame member 13 and a bracket 15 as a connecting member.

The frame member 13 is, for example, a hollow extruded member which has a quadrilateral cross-section perpendicular to the axial direction and which, as a whole, has a bow-like curved shape. In a cross-sectional view of the frame member 13, one of the diagonals extends in a direction which substantially coincides with the curvature direction of the frame member 13. Besides being such extruded member, the frame member 13 may be a round pipe or a polygonal pipe. The frame member 13 may have a shape having a projecting portion, such as a rib, outside, so long as the frame member 13 has a curved bent portion which elastically deforms. The frame member 13 may have a shape having a projecting portion inside. This frame member 13 is a bent member formed by press forming or by processing with any desired forming machine, e.g., a bender. Furthermore, the frame member 13 may be a solid member, e.g., a plate, a square bar, a round rod, or the like which is not hollow.

The frame member 13 is preferably an aluminum alloy from the standpoint of weight reduction, but may be a steel material having higher strength, such as mild steel or high-tensile-strength steel. As the aluminum alloy, use can be made of various aluminum alloys including heat-treated alloys, such as the 6000 series and the 7000 series, and non-heat-treated alloys, such as the 5000 series. The heat treatment type aluminum alloys are preferably ones which have undergone T1 or T5 thermal refining, and may be ones in which the vicinity of a bent portion has been locally softened.

The bracket 15 is connected to an intermediate portion along the longitudinal direction of the frame member 13. The bracket 15 is a plate or has a shape formed by bending a plate, and one edge thereof is welded to the frame member 13. The bracket 15 is preferably made of a material of the same kind weldable to the frame member 13. For example, in cases when the frame member 13 is an aluminum alloy, the bracket 15 also is an aluminum alloy.

<Device for Producing Frame Structure>

Figure 3:
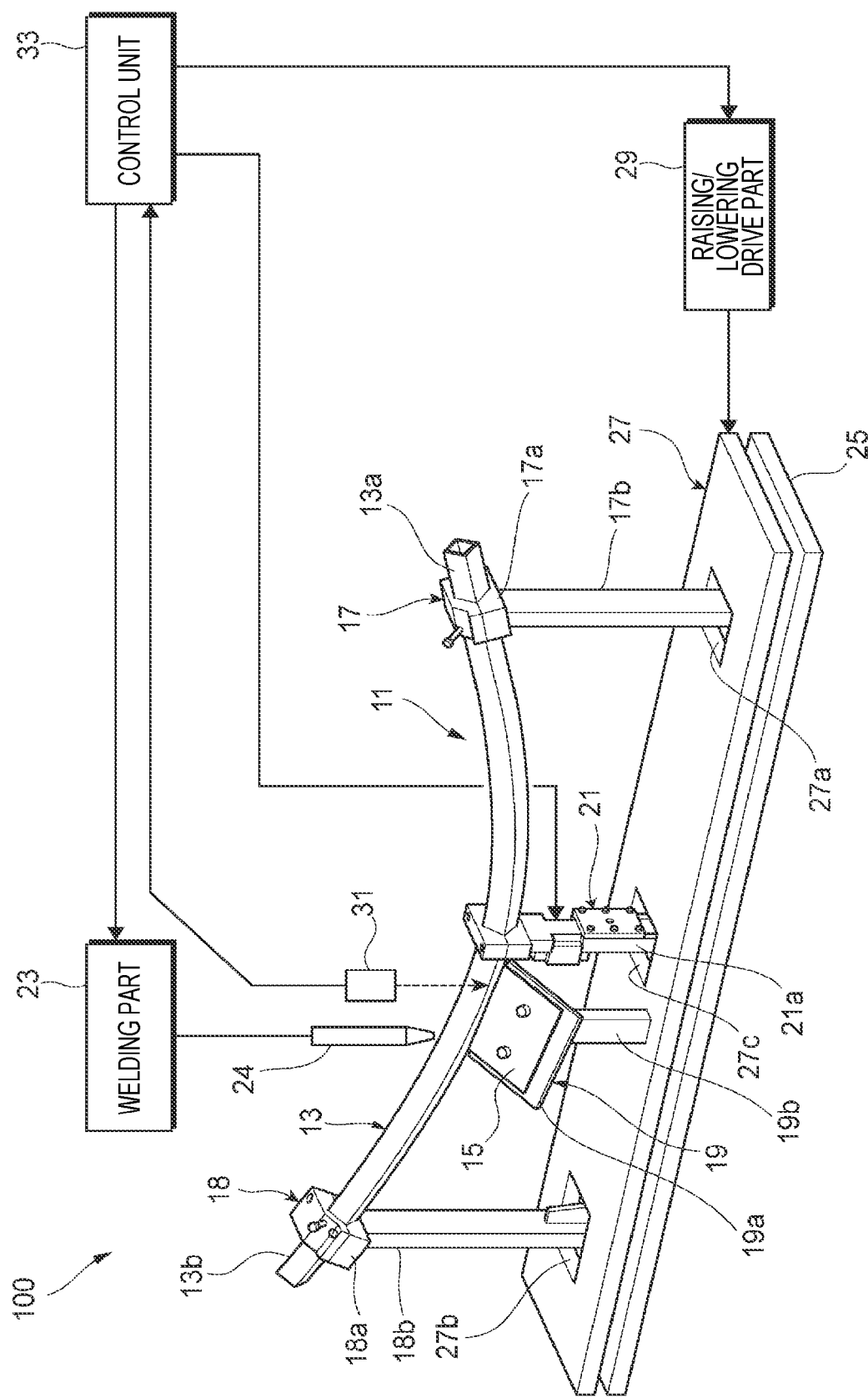
FIG. 3 is a diagram showing the entire configuration of a device for producing the frame structure.

FIG. 3 is a diagram showing the entire configuration of a device for producing the frame structure 11. In the following explanations, like members or portions are designated by like signs to omit or simplify the explanations.

The device (hereinafter referred to also as "production device") 100 for producing the frame structure 11 includes: a supporting part 17 which supports one end 13a of a frame member 13; a supporting part 18 which supports the other end 13b; a stand 19 for disposing thereon a bracket 15 opposite the frame member 13 somewhere along the longitudinal direction of the frame member 13; a frame-bending part 21; and a welding part 23.

The supporting part 17 includes a gripping part 17a for supporting the frame member 13 and a leg 17b having one end to which the gripping part 17a has been fixed. The supporting part 18 likewise includes a gripping part 18a and a leg 18b.

The stand 19 includes a fixing part 19a where the bracket 15 is placed and a leg 19b which supports the fixing part 19a, and the bracket 15 is positioned thereon with respect to the frame member 13.

The frame-bending part 21 has been disposed at an intermediate portion along the longitudinal direction of the frame member 13 and imposes a bending load on the frame member 13 in the top-bottom direction of FIG. 3. As a result, the frame member 13 undergoes three-point bending based on the ends 13a and 13b and the intermediate portion of the frame member 13, and a top-bottom-direction elastic deformation is thereby given to the intermediate portion of the frame member 13.

The welding part 23 welds the bracket 15 to the frame member 13. The welding part 23 performs fusion welding, such as MIG or TIG, at the tip of a welding torch 24, and various welding conditions during the welding, such as welding speed, welding current, and welding voltage, can be regulated.

The production device 100 includes a lower base plate 25, an upper base plate 27, and a raising/lowering drive part 29. The upper base plate 27 is disposed on the upper side of the lower base plate 25 substantially in parallel therewith. The raising/lowering drive part 29 raises/lowers the upper base plate 27 while keeping the upper base plate 27 in parallel with the plate surface of the lower base plate 25. The legs 17b and 18b of the supporting parts 17 and 18 and the leg 21a of the frame-bending part 21 are fixed to the lower base plate 25. The leg 19b supporting the stand 19 is fixed to the upper base plate 27, and the upper base plate 27 has openings 27a, 27b, and 27c through which the legs 17b, 18b, and 19b pierce, respectively.

The production device 100 further includes a gap detection part 31 which detects a gap between the connecting member 15 and the frame member 13 and a control unit 33 which performs general control of parts. The gap detection part 31 detects a gap between the connecting member 15 and the frame member 13. The gap detection part 31 may be, for example, a camera which captures an image of an area including the gap and outputs the captured image or may be any of various sensors including a contact type gap sensor for gap detection and a transmission type laser displacement sensor.

Figure 4:
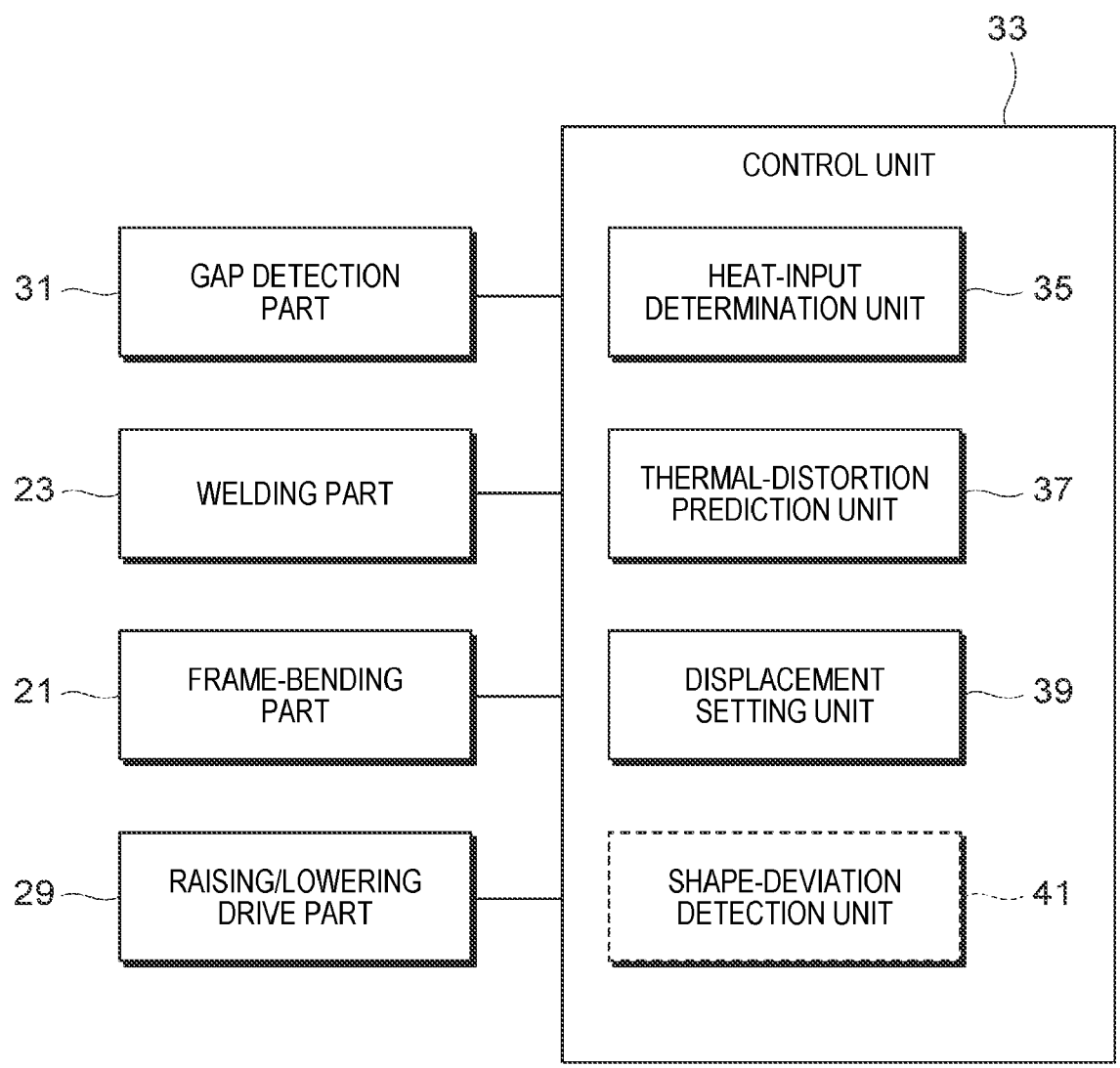
FIG. 4 is a block diagram showing functions of the control unit.

FIG. 4 is a block diagram showing functions of the control unit 33.

The control unit 33 is connected to the gap detection part 31, the welding part 23, the frame-bending part 21, and the raising/lowering drive part 29 and controls the parts. The control unit 33 includes a heat-input determination unit 35, a thermal-distortion prediction unit 37, and a displacement setting unit 39, and may further include a shape-deviation detection unit 41 which detects a shape deviation of the frame member 13.

The heat-input determination unit 35 determines a heat input (and welding conditions according to the heat input) to be sent to the welding part 23, in accordance with the size of the gap detected by the gap detection part 31.

The thermal-distortion prediction unit 37 predicts a thermal distortion occurring between the frame member 13 and the bracket 15 when the frame member 13 and the bracket 15 are welded under the determined heat-input conditions.

The displacement setting unit 39 determines an amount of elastic displacement to be given to the frame member 13, the amount of elastic displacement being for countervailing the thermal distortion predicted by the thermal-distortion prediction unit 37.

The shape-deviation detection unit 41 detects a deviation, from a design shape, of the frame member 13 which has not undergone the welding. In the case where the control unit 33 includes the shape-deviation detection unit 41, the displacement setting unit 39 determines an amount of the elastic deformation which countervails both the shape deviation detected by the shape-deviation detection unit 41 and the thermal distortion predicted by the thermal-distortion prediction unit 37. Processing by the units will be described in detail later.

Figure 5:
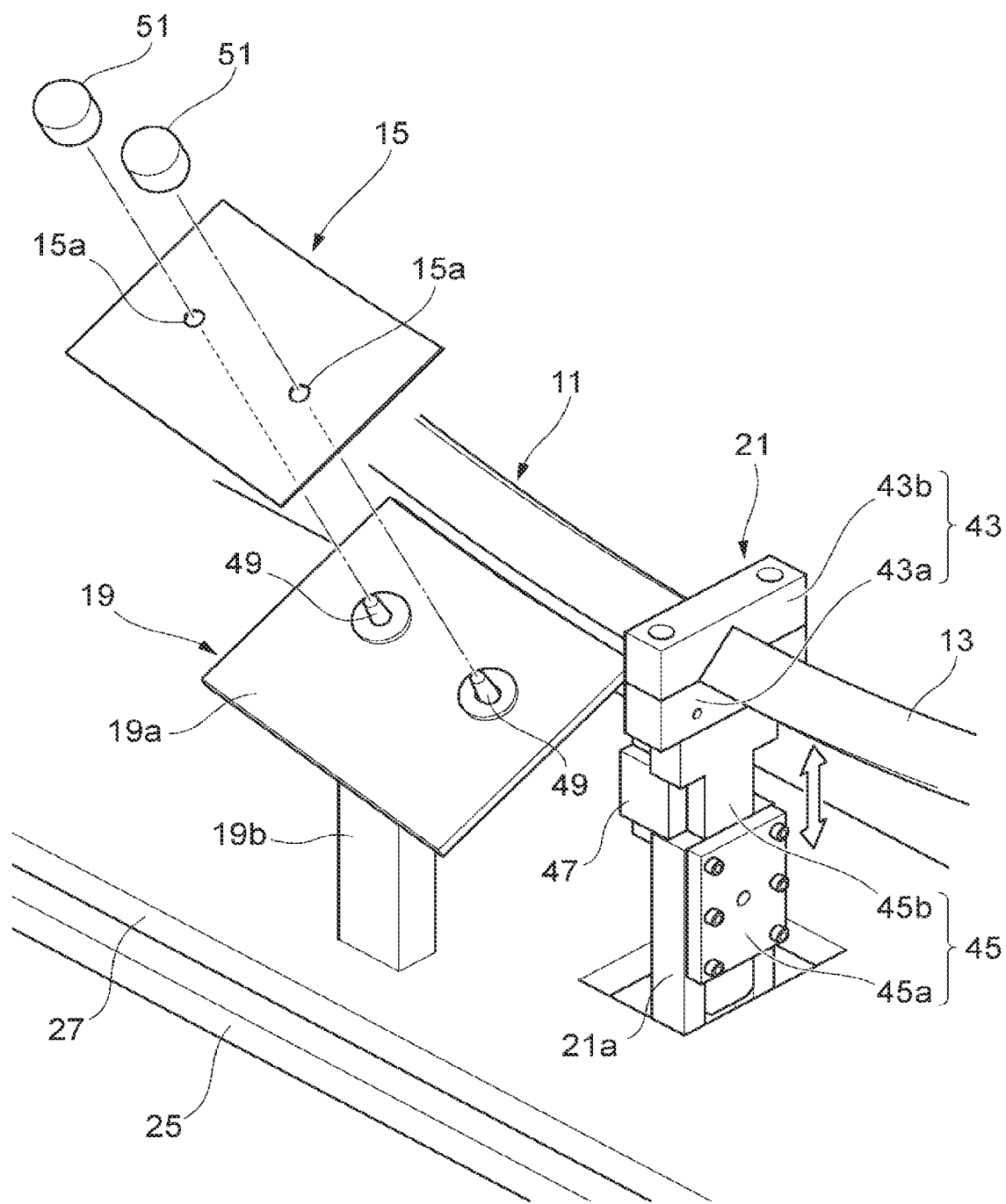
FIG. 5 is a view illustrating the configuration of a frame-bending part and showing how a bracket is disposed on a stand.

FIG. 5 is a view illustrating the configuration of the frame-bending part 21 and showing how a bracket 15 is disposed on the stand 19.

The frame-bending part 21 includes: a gripping part 43 which grips the frame member 13; a supporting mechanism 45 which supports the gripping part 43 so that the gripping part 43 can ascend/descend; and a driving part 47 which raises/lowers the gripping part 43.

The gripping part 43 includes a lower supporting part 43a and an upper supporting part 43b. The gripping part 43 grips the frame member 13 by sandwiching the frame member 13 between the lower supporting part 43a and the upper supporting part 43b in the direction of one of the diagonals of the frame member 13. Then, the lower supporting part 43a and the upper supporting part 43b are joined to each other with joining members, e.g., bolts, thereby fixing the frame member 13 to the gripping part 43. Since the gripping part 43 holds the frame member 13 by thus sandwiching the frame member 13 along the diagonal direction, the faces of the frame member 13 can be prevented from being partly pressed when a bending load is imposed on the frame member 13. A local cross-sectional deformation can hence be prevented.

The supporting mechanism 45 includes a fixed part 45a fixed to a leg 21a and a sliding part 45b, and the gripping part 43 is fixed to the sliding part 45b. The driving part 47 raises/lowers the sliding part 45b to give a downward pulling force or an upward pushing force to the frame member 13. The supporting parts 17 and 18, which support both ends of the frame member 13, include gripping parts 17a and 18a which each have the same gripping mechanism as the gripping part 43. The gripping parts 17a and 18a are fixing the frame member 13 by sandwiching the frame member 13 in the direction of the one diagonal thereof.

The leg 19b of the stand 19 has been disposed upright on the upper base plate 27, and a bracket 15 is placed on the upper surface of the fixing part 19a disposed at the upper end of the leg 19b. The stand 19 has a pair of pins 49 disposed so as to protrude from the upper surface of the fixing part 19a. The bracket 15 has through holes 15a corresponding to the pins 49. The pair of pins 49 has been provided to the stand 19 so as to be located in a given position satisfying positional relationships with the supporting parts 17 and 18.

The bracket 15 is placed on the upper surface of the fixing part 19a, with the pins 49 being inserted respectively into the through holes 15a. Clamps 51 are fitted to the pins 49 protruding through the through holes 15a. By the fitting of the clamps 51, the bracket 15 is positioned on the fixing part 19a. Thus, the bracket 15 is fixed in the base position with respect to the supporting parts 17 and 18. In this position, the bracket 15 is temporarily fixed to the frame member 13; the temporary fixing will be described later.

FIG. 6A is a front view of the production device 100, the view showing an initial state of the upper base plate 27. FIG.

6B is a front view of the production device 100, the view showing the upper base plate 27 in the state of having been lowered toward the lower base plate 25.

As FIG. 6A shows, the raising/lowering drive part 29 raises/lowers the upper base plate 27 to separate the upper base plate 27 from the lower base plate 25. The base position of the bracket 15 can be regulated by raising the upper base plate 27 with the raising/lowering drive part 29. The bracket 15 in the base position is fixed to the stand 19 and temporarily fixed to the frame member 13.

As FIG. 6B shows, as the raising/lowering drive part 29 lowers the upper base plate 27 toward the lower base plate 25, the bracket 15 which has been temporarily fixed is released from the fixing to the stand 19. That is, since the frame member 13 has been fixed to the supporting parts 17 and 18, when the stand 19 descends integrally with the upper base plate 27, then the bracket 15 remains on the frame member 13 side and separates from the stand 19.

The welding part 23 is operated so that the bracket 15 temporarily fixed to the frame member 13 is final-welded to the frame member 13.

<Production Procedure>

A procedure for producing a frame structure 11 by the production device 100 having the configuration described above is explained.

Figure 7:
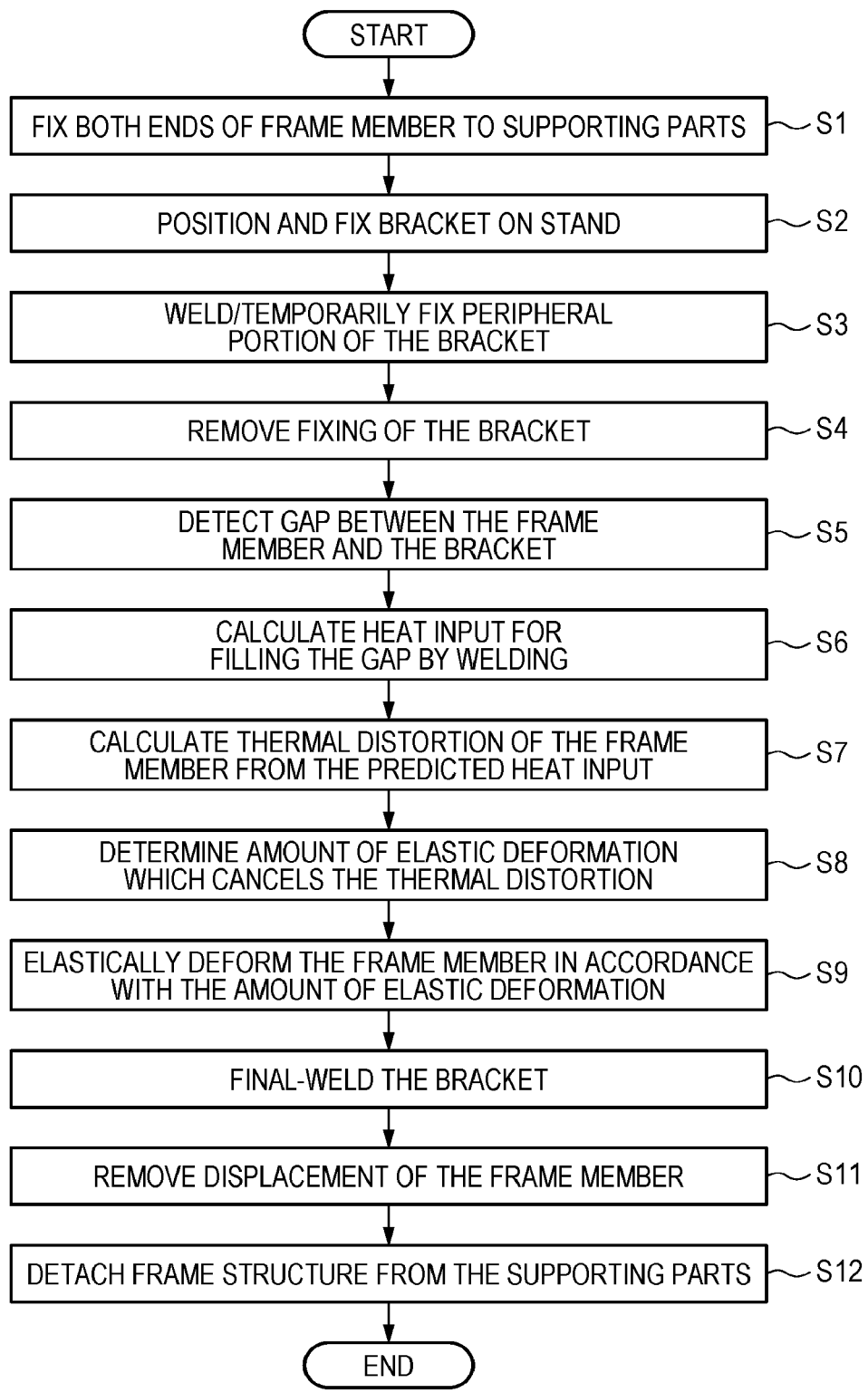
FIG. 7 is a flowchart showing steps for producing the frame structure.

FIG. 7 is a flowchart showing steps for producing the frame structure 11.

For producing the frame structure 11, both ends 13a and 13b of one frame member 13 which has been curved beforehand are fixed respectively to the supporting parts 17 and 18 of the production device 100 (step 1: S1).

Next, a bracket 15 to be connected to the frame member 13 is positioned on the stand 19 and fixed thereto (S2). At this time, the upper base plate 27 is disposed in a position above the lower base plate 25 as shown in FIG. 6A.

Figure 8A:
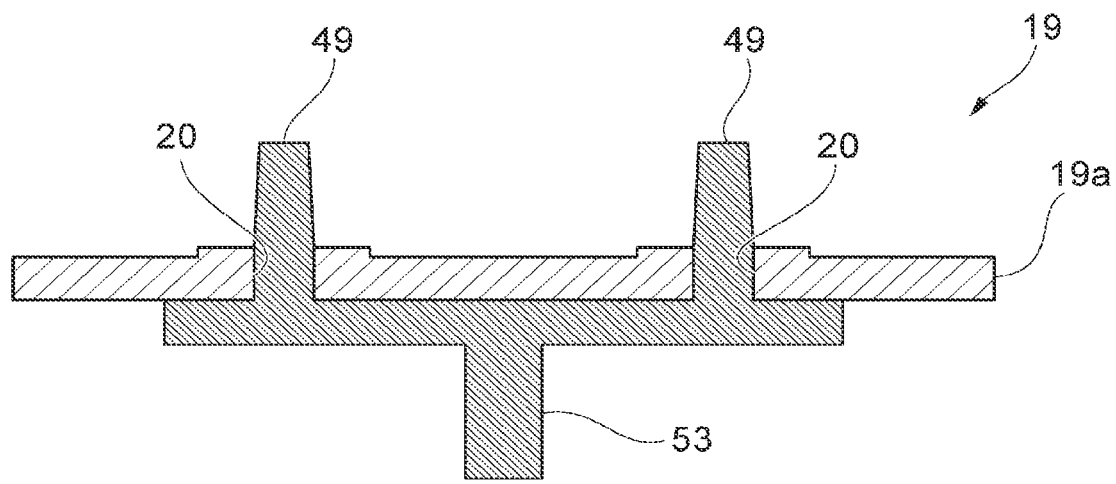
FIG. 8A is a view illustrating some of a procedure for positioning a bracket on the stand.
Figure 8B:
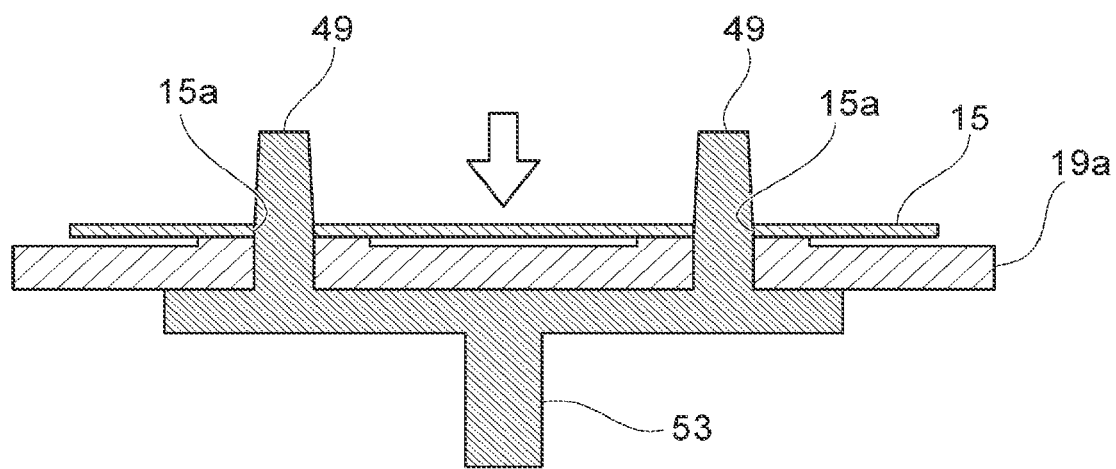
FIG. 8B is a view illustrating some of the procedure for positioning the bracket on the stand.
Figure 8C:
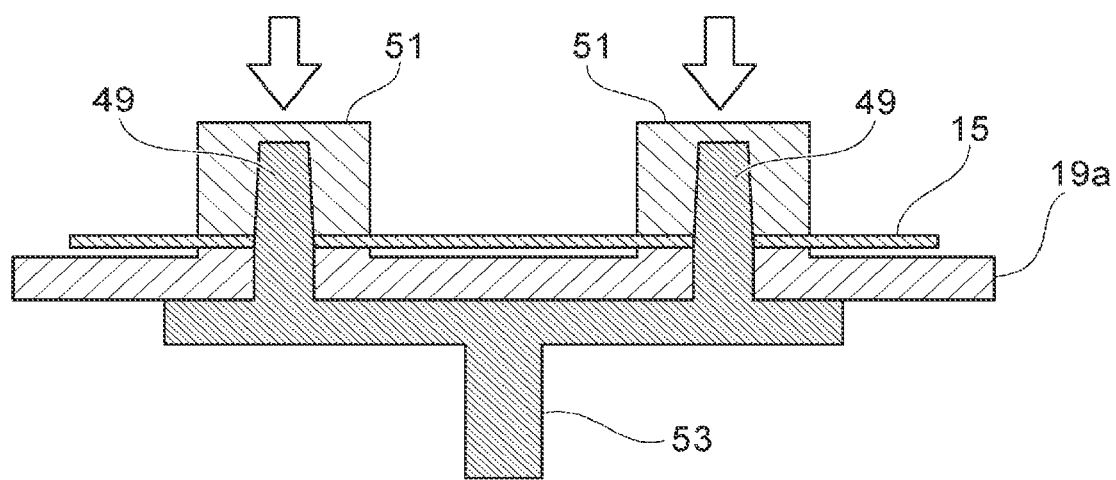
FIG. 8C is a view illustrating some of the procedure for positioning the bracket on the stand.

FIG. 8A to FIG. 8C are views illustrating a procedure for positioning the bracket on the stand 19.

As FIG. 8A shows, the stand 19 has a pair of pins 49 disposed so as to protrude through through holes 20 formed in the fixing part 19a. Each of the pins 49 has an approximately cylindrical shape with a tapered peripheral surface. The bases of the pins 49 are connected to a common base portion 53.

As FIG. 8B shows, the bracket 15 is placed on the fixing part 19a, with the pins 49 inserted into though holes 15a of the bracket 15. By disposing the pins 49 in given positions, the bracket 15 is guided by the pins 49 piercing the through holes 15a and positioned in a base position. Then, as FIG. 8C shows, clamps 51 are fitted to the end-side portions of the pins 49 to press the bracket 15 with the lower surfaces of the clamps 51. Thus, the bracket 15 is positioned and fixed to the stand 19. A gap is left between the bracket 15 disposed in the base position and the frame member 13. That is, the base position of the bracket 15 is set so that the bracket 15 and the frame member 13 are not in contact with each other and a given gap is formed therebetween.

Next, the bracket 15 fixed to the stand 19 is temporarily fixed to the frame member 13 (S3). For this temporary fixing, a known tool for temporary fixing can be used. For example, the bracket 15 is connected to the frame member 13 with an appropriate clamper, although not shown in the drawing. This temporary fixing part 55 is the portion to be subjected to final-welding which will be described later. In accordance with the size, shape, etc. of the bracket 15, a weld for temporary fixing to the frame member 13 may be disposed in a position other than the temporary fixing part 55. In this case, a portion of the bracket 15 which is more separated from the frame-bending part 21 is welded to the frame member 13 with the welding part 23.

Figure 9:
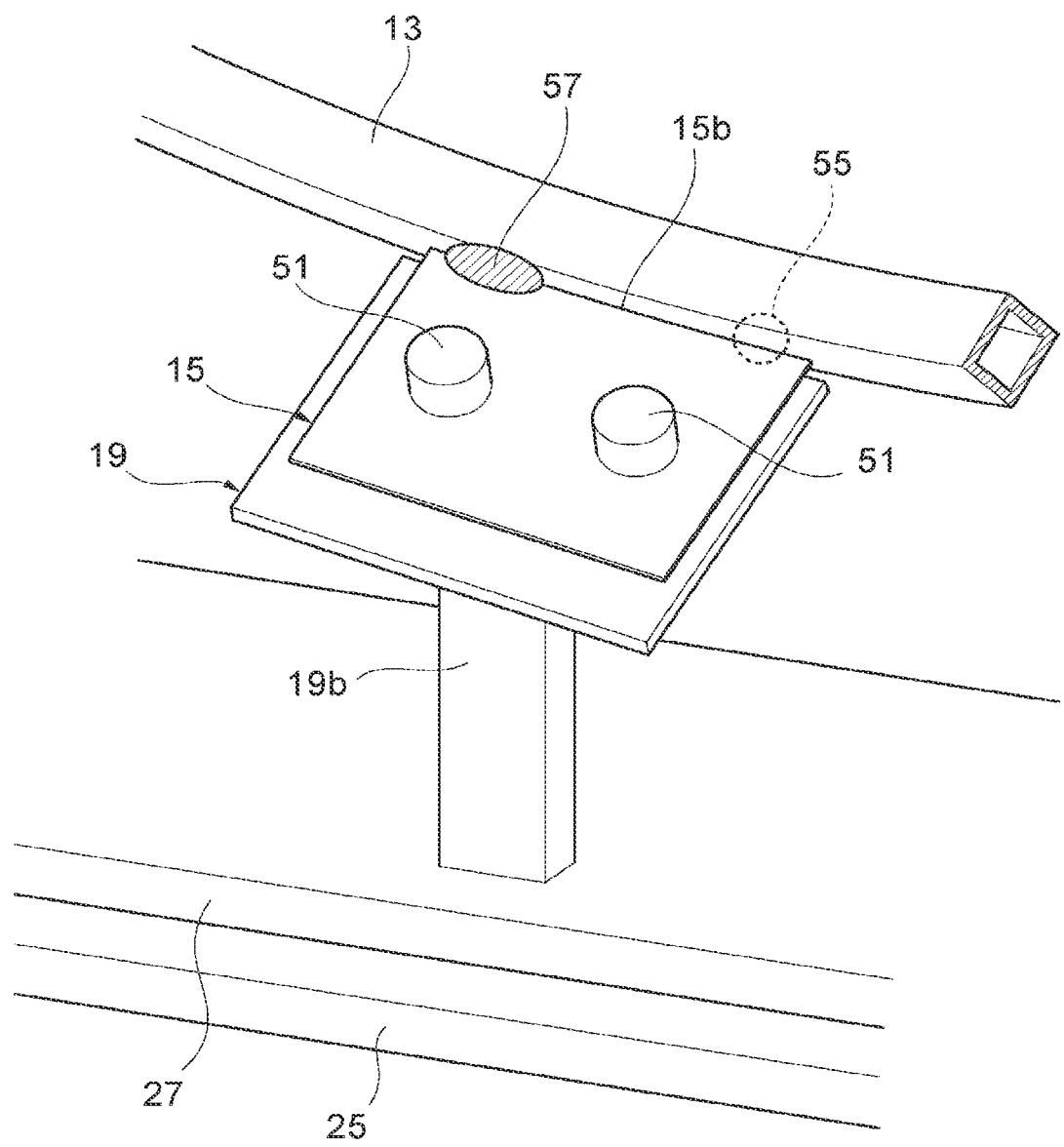
FIG. 9 is a view illustrating how the bracket is temporarily fixed to the frame member.

FIG. 9 is a view illustrating how the bracket 15 is temporarily fixed to the frame member 13.

In the bracket 15 fixed to the stand 19, the temporary fixing part 55 is formed at a portion on the frame-bending part side (right-hand side in FIG. 9) of an opposed edge 15b facing the frame member 13. Meanwhile, at a portion of the bracket 15 which is on the side more separated from the frame-bending part (left-hand side in FIG. 9), a weld 57 for temporary fixing is formed. By the temporary fixing part 55 and the weld 57, the bracket 15 is temporarily fixed to the frame member 13. The gap between the opposed edge 15b of the bracket 15 and the frame member 13 preferably has a constant width along the whole opposed edge 15b.

Next, after the bracket 15 has been temporarily fixed to the frame member 13, the fixing of the bracket 15 to the stand 19 is removed (S4).

Figure 10:
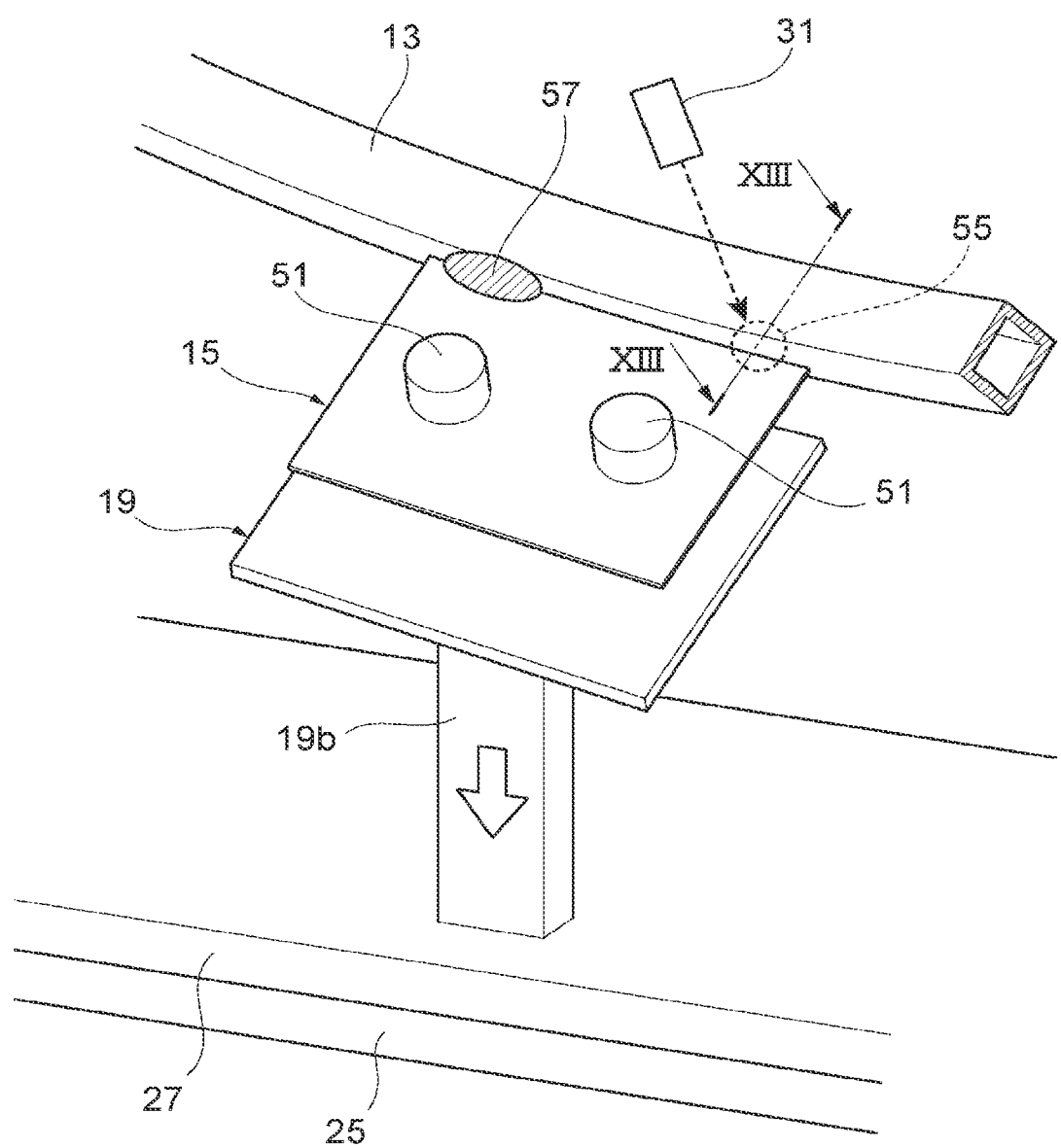
FIG. 10 is a view illustrating a state in which the stand has been lowered to remove the fixing of the bracket thereto.

FIG. 10 is a view illustrating a state in which the stand 19 has been lowered to remove the fixing of the bracket 15 thereto.

By operating the raising/lowering drive part 29 as shown in FIG. 6B, which was described above, the upper base plate 27 is moved toward the lower base plate 25 to thereby lower the stand 19. As a result, the bracket 15 separates from the stand 19 while being temporarily fixed to the frame member 13.

Figure 11A:
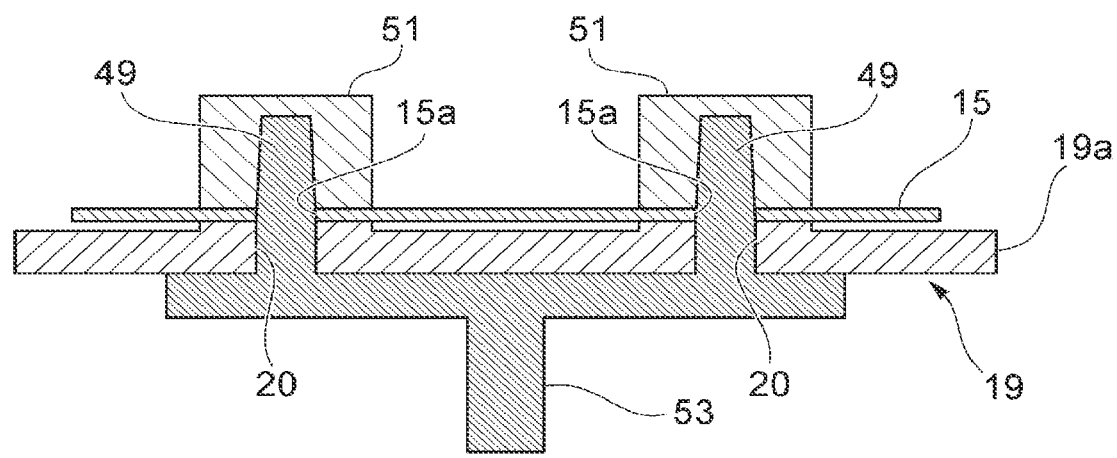
FIG. 11A is a view illustrating, in more detail, how the bracket is detached from the stand.
Figure 11B:
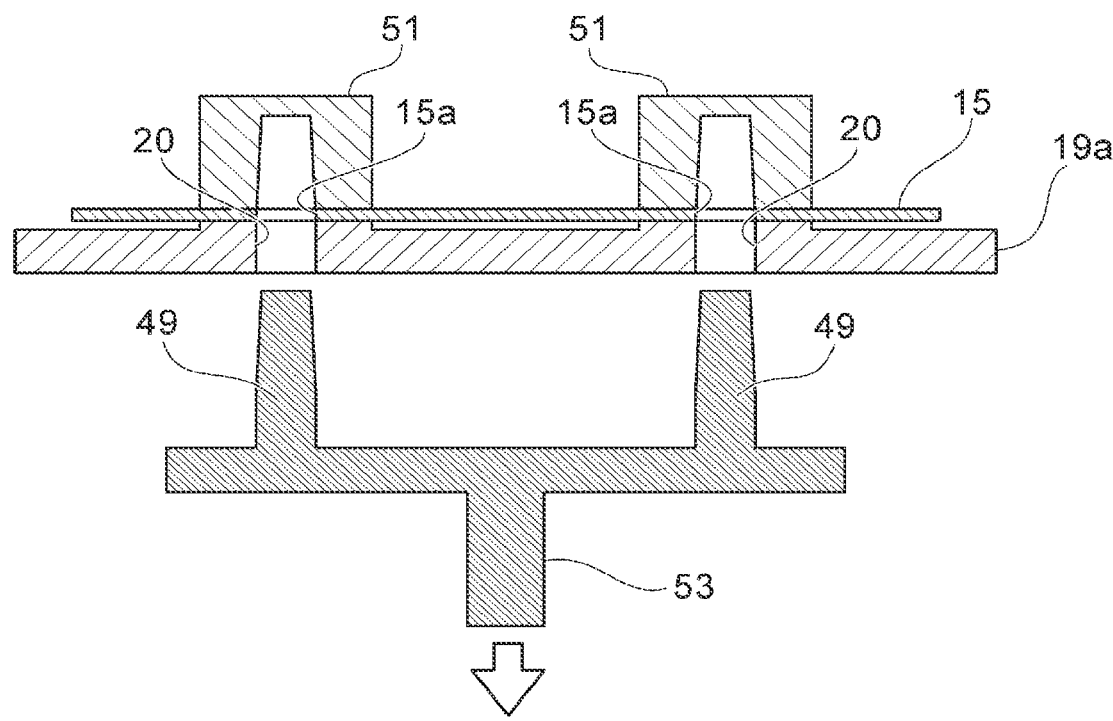
FIG. 11B is a view illustrating, in more detail, how the bracket is detached from the stand.
Figure 11C:
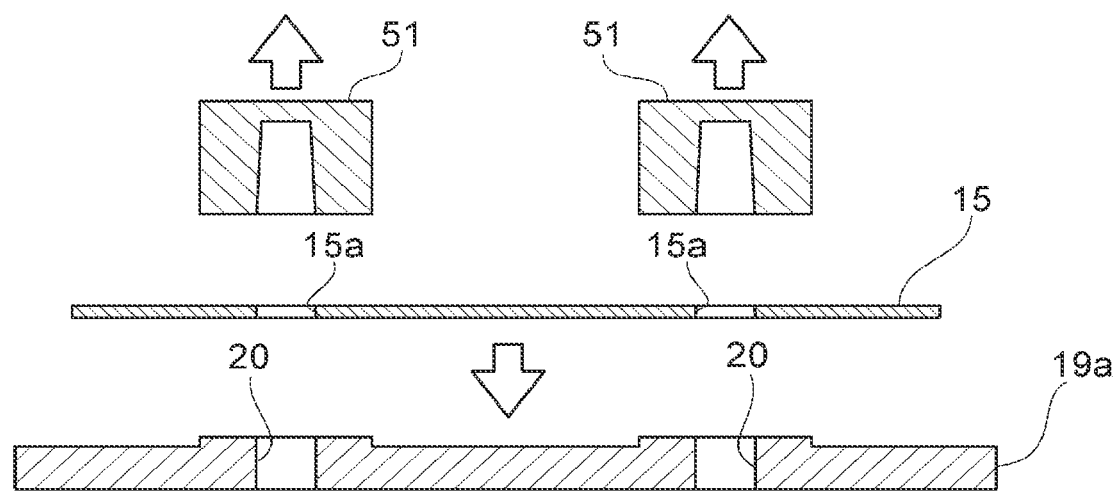
FIG. 11C is a view illustrating, in more detail, how the bracket is detached from the stand.

FIG. 11A to FIG. 11C are views illustrating, in more detail, how the bracket 15 is detached from the stand 19.

The bracket 15 in the state of being fixed to the stand 19 with the clamps 51 as shown in FIG. 11A is detached in the following manner. First, as FIG. 11B shows, the clamps 51 are loosened and the base portion 53 is then lowered to draw out the pair of pins 49 from the fixing part 19a of the stand 19. Next, as FIG. 11C shows, the fixing part 19a is lowered. The bracket 15 is thereby separated from the fixing part 19a while being supported by the frame member 13. The clamps 51 are appropriately collected. Thus, the fixing of the bracket 15 to the stand 19 is removed.

Next, a gap between the frame member 13 and the bracket 15 is detected (S5).

The bracket 15, when fixed to the stand 19, is positioned so as to have a gap between itself and the opposed frame member 13. The bracket 15 is then temporarily fixed to the frame member 13 while retaining the gap and is separated from the stand 19. The gap detection part 31 shown in FIG. 10 detects the width of the gap formed between the frame member 13 and the bracket 15 which has been temporarily fixed to the frame member 13 in the manner shown above.

Figure 12:
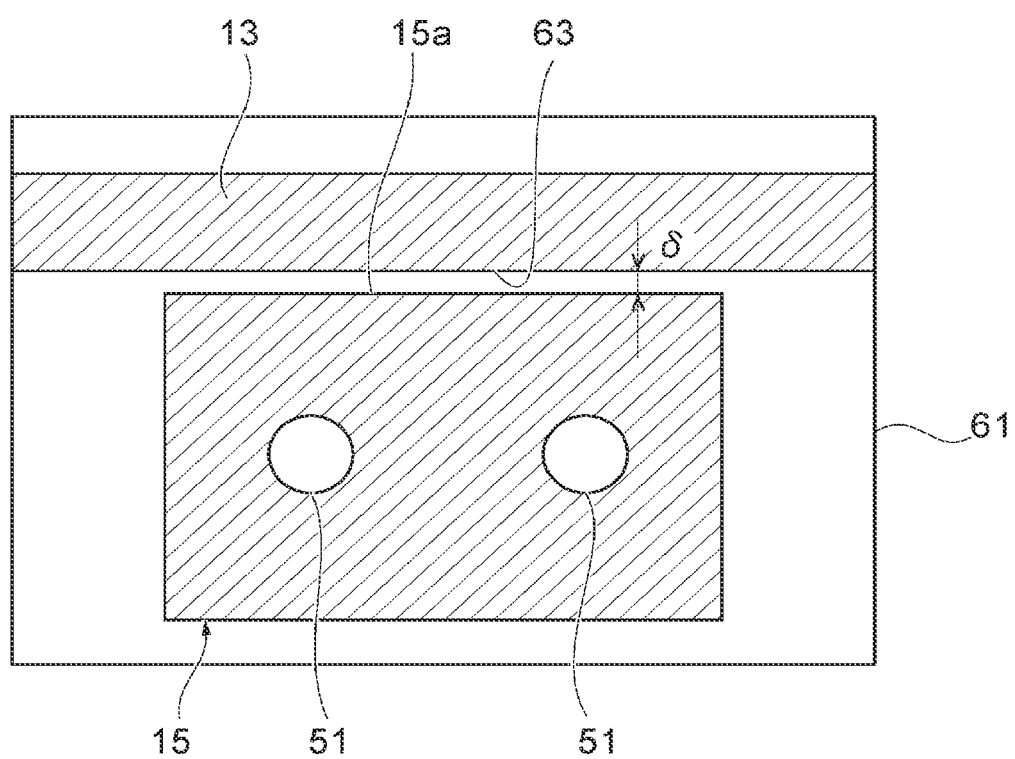
FIG. 12 is a diagram schematically illustrating a captured image taken when a gap is detected.

FIG. 12 is a diagram schematically illustrating a captured image 61 taken when the gap is detected.

In the case where the gap detection part 31 is a camera, the captured image 61 obtained by photographing the gap is subjected to image processing to detect the opposed edge 15b of the bracket 15 and an edge portion 63 of the frame member 13, and the gap width $\delta$ of the gap formed therebetween is determined arithmetically.

Next, in accordance with the determined gap width $\delta$, the temporarily fixed bracket 15 and the frame member 13 are final-welded to each other. Steps ranging from detection of the gap to the final-welding are conducted by the following procedure.

FIG. 13A to FIG. 13E are cross-sectional views taken on the line XIII-XIII of FIG. 10, which show steps ranging from after gap detection to final-welding, in stages.

Figure 13A:
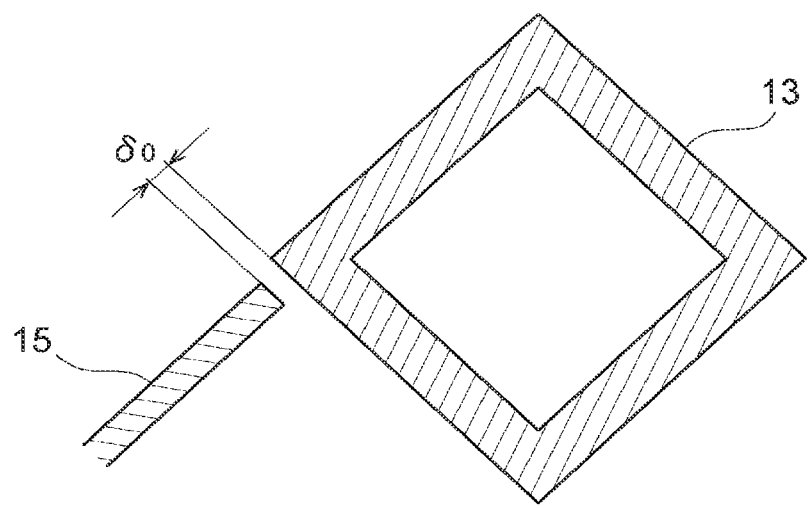
FIG. 13A is a cross-sectional view taken on the line XIII-XIII of FIG. 10, the view showing, in stages, steps ranging from after gap detection to final-welding.

It is assumed that the gap between the bracket 15 and the frame member 13 has a gap width $\delta_0$ as shown in FIG. 13A.

In this case, the gap between the bracket 15 and the frame member 13 is to be filled by final-welding to join the bracket 15 to the frame member 13. This final-welding necessitates a heat input according to the size of the gap width $\delta_0$ of the gap. However, if final-welding is conducted under welding conditions with which the heat input is obtained, a thermal distortion occurs according to the heat input at the weld after the welding. As a result, the shape of the frame member 13 in which both ends are supported has a displacement (bending) and the shape (radius of curvature) of the frame member 13 undesirably deviates from a design shape.

Figure 13B:
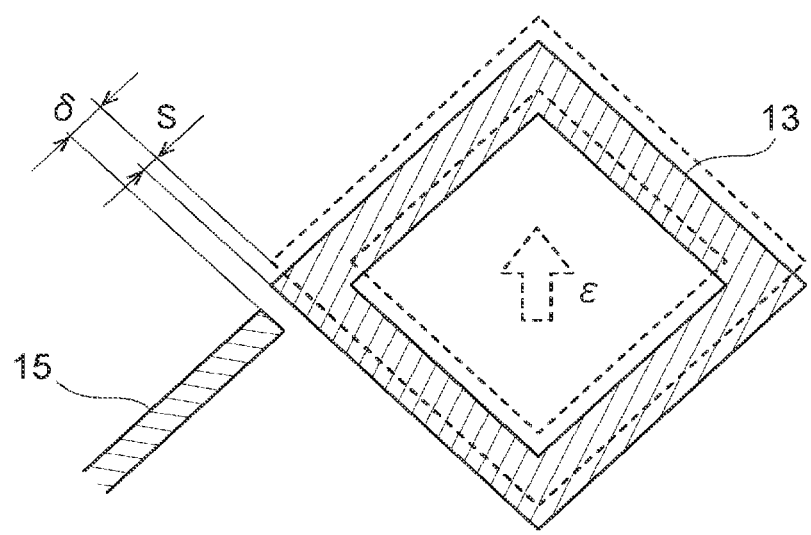
FIG. 13B is a cross-sectional view taken on the line XIII-XIII of FIG. 10, the view showing, in stages, steps ranging from after gap detection to final-welding.

FIG. 13B shows, with broken lines, how the final-welding conducted with the heat input according to the gap width $\delta_0$ undesirably results in a displacement amount S due to a thermal distortion F and makes the gap between the bracket 15 and the frame member 13 have a gap width $\delta$. This gap width $\delta$ includes a deviation S from the initial gap width $\delta_0$.

Because of this, the control unit 33 shown in FIG. 4 eliminates the deviation from the initial gap width $\delta_0$ in the following manner.

The heat-input determination unit 35 calculates a heat input necessary for filling the detected gap width $\delta_0$ of the gap (S6). For example, the heat-input determination unit 35 regulates parameters such as weld-bead length L, welding speed V, welding current I, and welding voltage E and calculates a heat input for the final-welding. The heat input Q can be determined by arithmetic processing as a function of those parameters ($Q=f(\delta_0, L, V, I, E)$).

The thermal-distortion prediction unit 37 predicts a thermal distortion which will occur in the frame member 13 when final-welding is conducted under welding conditions with which the calculated heat input is obtained (S7). This prediction of a thermal distortion may be made using a simulation by, for example, analysis of thermal elasticity/plasticity, or may be made using a data base in which amounts of thermal distortion corresponding to the parameters have been tabled beforehand.

In accordance with the determined direction and size of the thermal distortion, the displacement setting unit 39 determines a displacement direction and a displacement amount for elastically deforming the frame member 13 so that the thermal distortion is countervailed thereby (S8). Specifically, the displacement setting unit 39 determines a displacement amount whereby the frame member 13 is elastically deformed just in an amount corresponding to the amount of the thermal distortion toward the direction opposite to the direction of the thermal distortion.

Figure 13C:
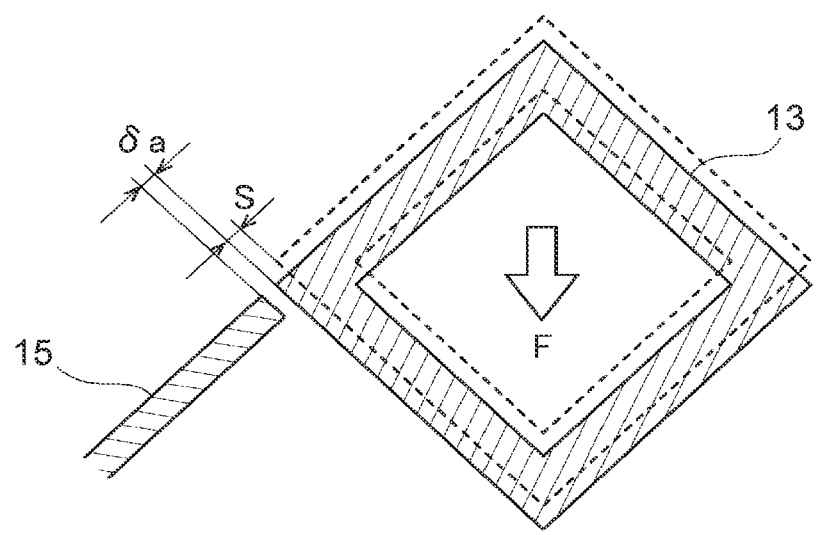
FIG. 13C is a cross-sectional view taken on the line XIII-XIII of FIG. 10, the view showing, in stages, steps ranging from after gap detection to final-welding.

The control unit 33 operates the frame-bending part 21 in accordance with the determined displacement direction and displacement amount to elastically deform the frame member 13 (S9). That is, as FIG. 13C shows, a bending load F is imposed on the frame member 13 in the direction opposite to the direction of the predicted thermal distortion ε occurring in the frame member 13, thereby elastically deforming the frame member 13 over a distance which is the same as the displacement amount S due to the thermal distortion ε. At this time, the gap has a gap width $\delta a$ ($=\delta-S$).

Figure 13D:
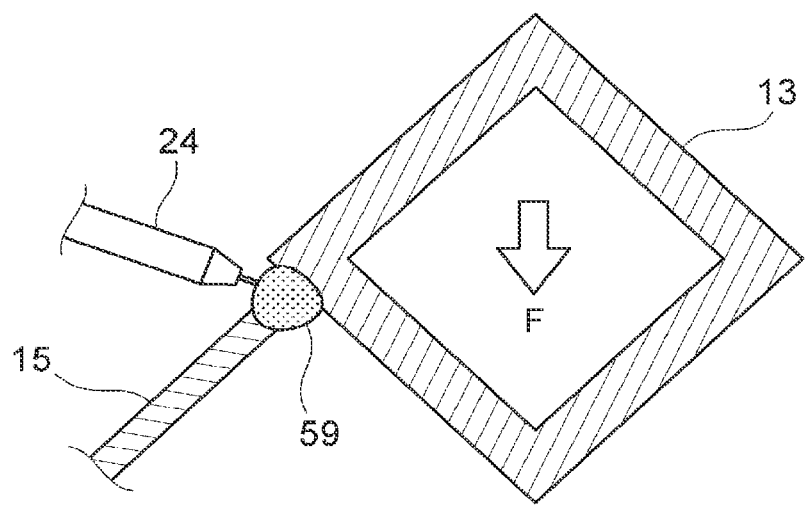
FIG. 13D is a cross-sectional view taken on the line XIII-XIII of FIG. 10, the view showing, in stages, steps ranging from after gap detection to final-welding.
Figure 13E:
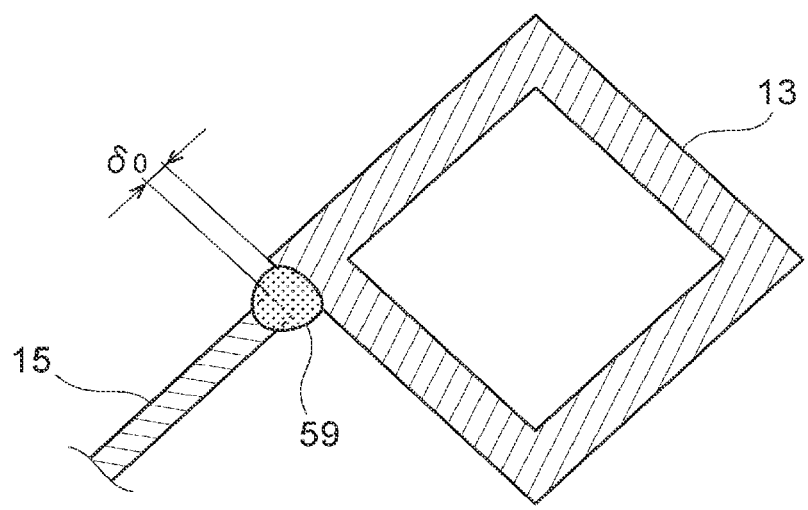
FIG. 13E is a cross-sectional view taken on the line XIII-XIII of FIG. 10, the view showing, in stages, steps ranging from after gap detection to final-welding.

While the frame member 13 is kept in the elastically deformed state shown in FIG. 13C, final-welding is conducted as shown in FIG. 13D (S10). As a result, as FIG. 13E shows, the bracket 15 which has undergone the final-welding has been joined to the frame member 13 via a final-weld 59 so that the gap width $\delta_0$ before the welding is maintained. That is, the frame member 13 is joined to the bracket 15 without being affected by a thermal distortion due to the final-welding.

After this final-welding, the imposition of the bending load F by the frame-bending part 21 is removed (S11). Then, a frame structure 11 including the welded bracket 15 is detached from the supporting parts 17 and 18 and frame-bending part 21 shown in FIG. 3 (S12). Thus, the frame structure 11 which has undergone a minimized influence of a thermal distortion due to the final-welding is obtained.

<Warm Forming>

The frame member 13 may be warm-formed by the heat input for the final-welding, and this enables the frame member 13 which has undergone the welding to have a fixed shape without showing spring back. That is, due to the effect of the warm forming, the frame member 13 which has undergone final-welding while being elastically deformed can retain the corrected shape of the frame member 13 as such even after having been returned to ordinary temperature. This warm forming is explained next.

Figure 14:
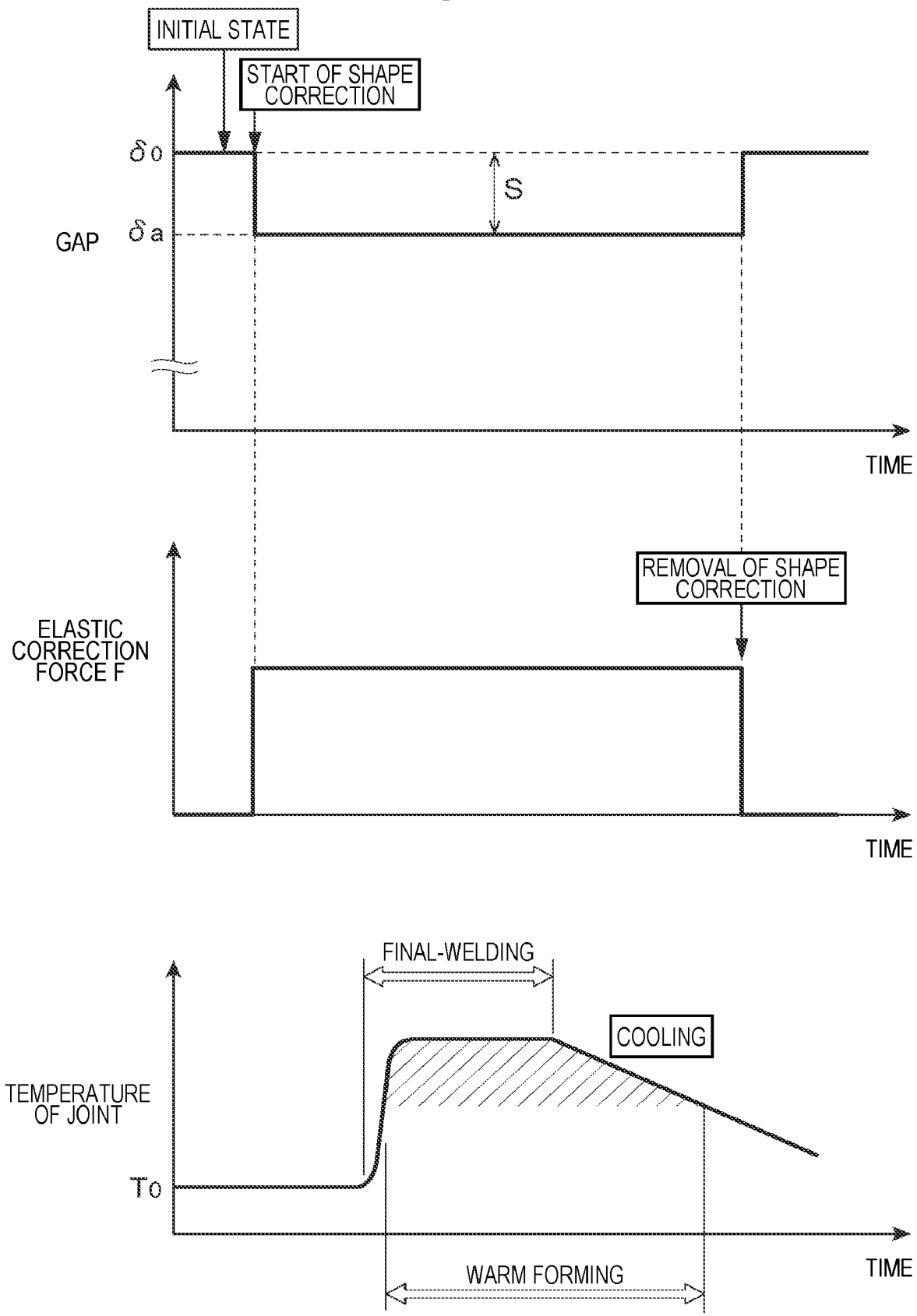
FIG. 14 is charts schematically showing a processing in which the frame member, with both ends being supported, is elastically deformed and the bracket is final-welded thereto.

FIG. 14 is charts schematically showing a processing in which the frame member 13, with both ends being supported, is elastically deformed and the bracket 15 is final-welded thereto.

The gap between the bracket 15 which had undergone the temporary fixing described above and the frame member 13 initially had a gap width $\delta_0$. By imposing a bending load F with the frame-bending part 21, the frame member 13 is made to have a displacement amount S and the shape thereof is corrected so that the gap has a gap width $\delta a$.

While the bracket 15 and the frame member 13 are kept in that state, the bracket 15 and the frame member 13 are final-welded to each other. As a result, the temperature of the joint rises as the heat inputted for the final-welding is transferred. The joint at this time is heated to about 200° C., or to temperatures exceeding 200° C. in some portions. The period from the time when the joint has heated up to such a warm-forming temperature or higher to the time when the joint temperature becomes lower than the warm-forming temperatures after the welding period is a warm-forming period.

Figure 15:
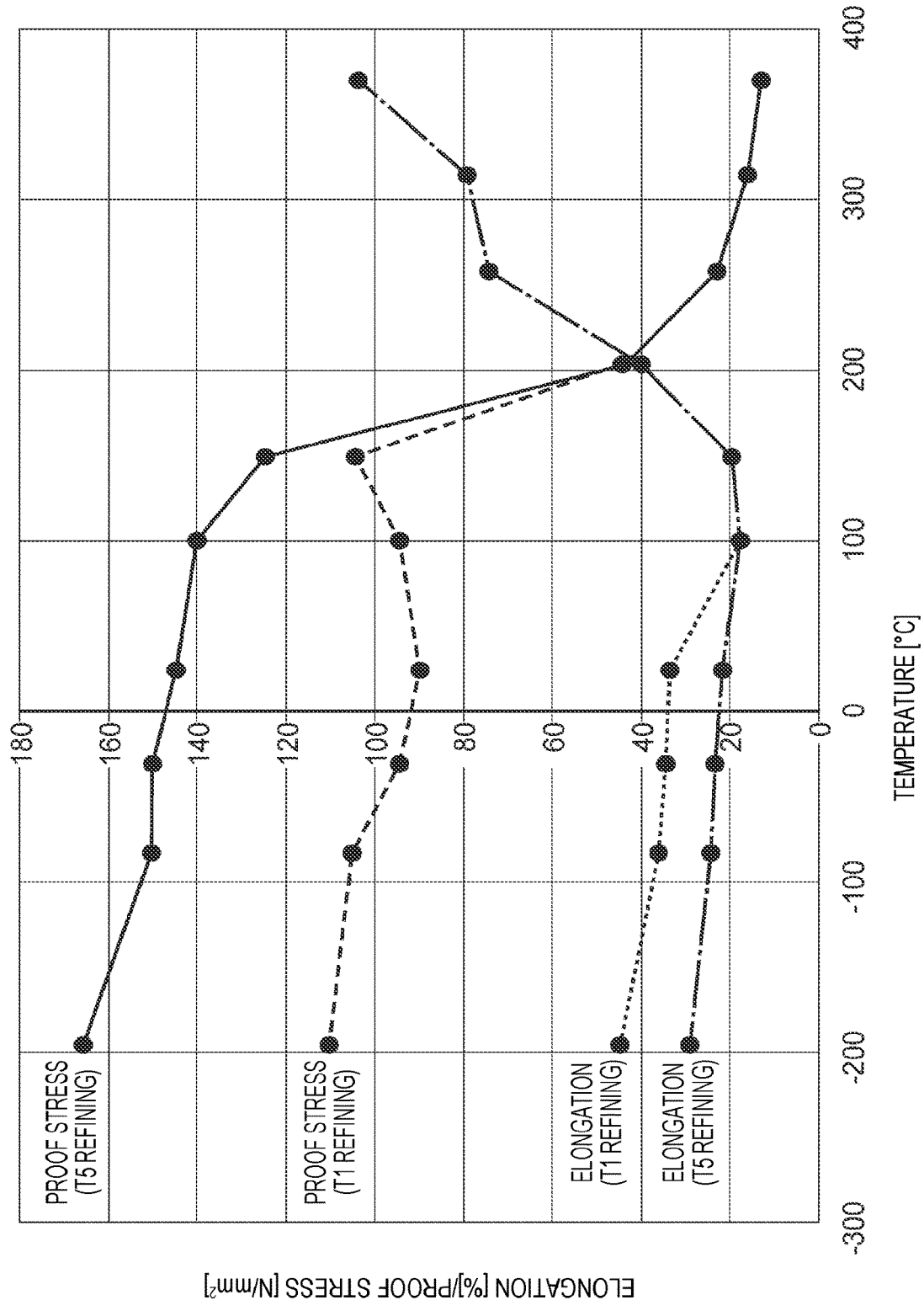
FIG. 15 is graphs showing tensile properties of an aluminum alloy (6063).

FIG. 15 is graphs showing tensile properties of an aluminum alloy (6063).

A heat treatment type aluminum alloy (6063) as an example shows the following proof stress [N/mm²] and elongation [%] properties. In cases when the aluminum alloy is one which has undergone T1 refining and one which has undergone T5 refining, the proof stress decreases considerably especially at around 200° C. and the elongation is inhibited from increasing. These properties can be utilized in the following manner. When the frame member 13, while being elastically deformed, is heated to a warm-forming temperature by the heat input for the final-welding, then the shape of the frame member 13 in the elastically deformed state is fixed by the warm forming thereof. As a result, even after removal of the shape correction by the bending load F, the frame member 13 retains the shape while maintaining the gap width $\delta a$ of the gap, as shown in FIG. 14. In this case, a lower limit of the warm-forming temperatures is preferably 170° C. or higher, more preferably 200° C. or higher. An upper limit of the warm-forming temperatures is preferably 370° C. or lower, more preferably 320° C. or lower, still more preferably 250° C. or lower. The term "warm-forming temperatures" means a range of temperatures at which the material used (the bracket 15, frame member 13, weld metal) is warm-formed.

The explanation given above is on an aluminum alloy (6063). However, so long as use is made of materials which have similar material properties and on which the shape-fixing effect of warm forming is obtained, a frame structure 11 having a desired shape is obtained by the same processing.

Figure 16:
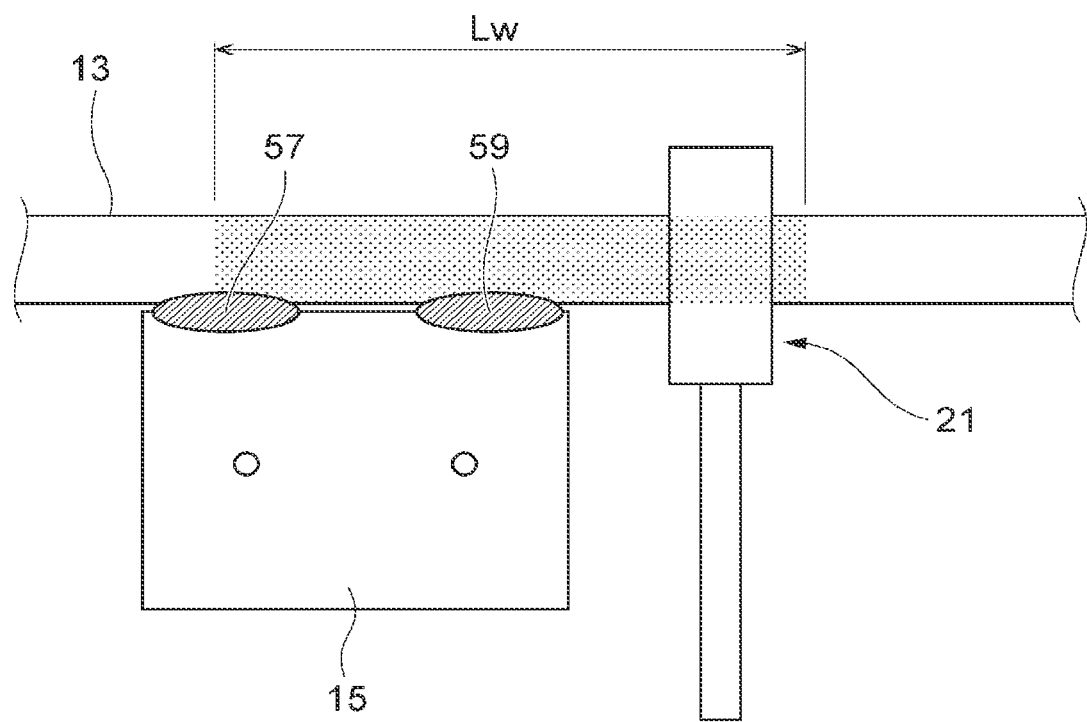
FIG. 16 is a diagrammatic view showing a heat distribution in final-welding.

FIG. 16 is a diagrammatic view showing a heat distribution in final-welding.

When the bracket 15 and the frame member 13 are final-welded to each other, the heat inputted for the final-welding is transferred from the final-weld 59 along the longitudinal direction of the frame member 13. When a region where the frame member 13 is heated to a warm-forming temperature by the heat input is expressed by Lw, the frame-bending part 21 is preferably included in the region Lw. The bending load is imposed at such a position that the frame member 13 shows a maximum displacement amount. The closer the maximum-displacement position to the final-weld 59, the more the frame-bending part 21 is apt to be included, even with a low heat input, in the region where the frame member 13 is heated to or above warm-forming temperatures. Thus, the frame structure 11 can be made to have a shape as designed.

<In the Case of Hollow Member with Shape Deviation>

In the procedure described above, a bracket 15 was joined to a frame member 13 so that the final-welding of the bracket 15 resulted in a gap having the gap width $\delta_0$. However, in the case where a frame member 13 which has been curved beforehand has a deviation from a design shape, it is necessary to join the frame member 13 so as to result in a gap having a width that eliminates the deviation thereof, instead of having the gap width $\delta_0$.

Figure 17:
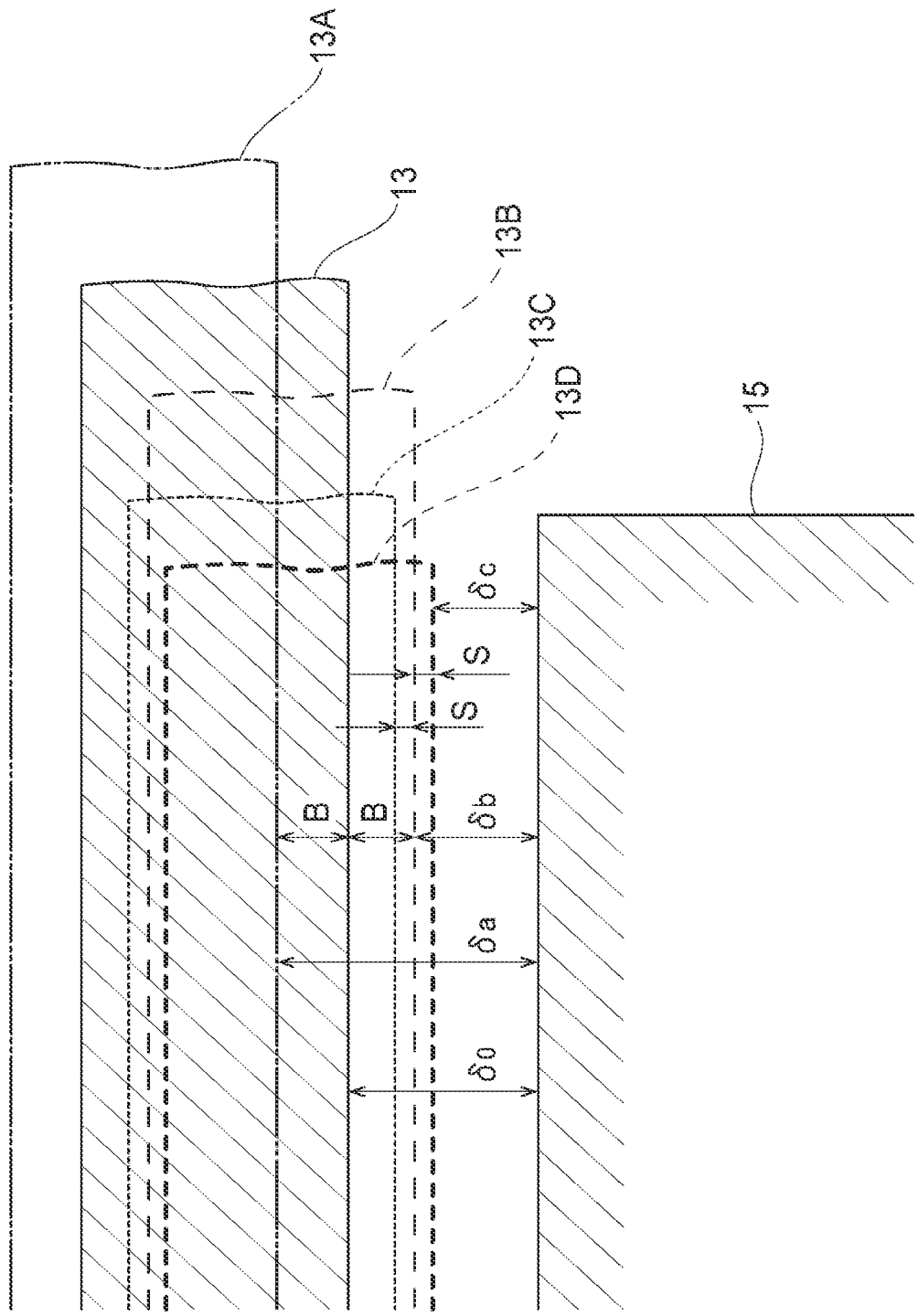
FIG. 17 is a diagram illustrating gaps between the frame member and the bracket in cases when the frame member has a deviation from a design shape.

FIG. 17 is a diagram illustrating gaps between a frame member 13 and a bracket in cases when the frame member 13 has a deviation from a design shape.

It is assumed that a detected value of the gap between the frame member 13 and the bracket 15 before final-welding was a gap width $\delta_0$ (the frame member 13 indicated by a continuous line in FIG. 17). It is further assumed that this frame member 13 however has a shape deviation B and, in the case of a shape as designed, is disposed in a position which results in a gap width $\delta a$ (the frame member 13A indicated by an alternate long and two-short dash line). In this case, in order to countervail the shape deviation B, the frame member is first elastically deformed so that the frame member is moved to a position (the frame member 13B indicated by a thin broken line) shifted from the frame member 13 in the direction opposite to the direction of the deviation (i.e., in such a direction that the frame member approaches the bracket 15), and both ends of the bracket 15 are then temporarily fixed thereto.

Thereafter, final-welding is to be conducted with a heat input according to the gap width $\delta b$ of the gap. In this case, it is predicted that due to a thermal distortion caused by the final-welding, the frame member 13B shifts by a displacement amount S to a position (the frame member 13C indicated by a dotted line). Accordingly, the frame member is elastically deformed so that the frame member shifts in the direction opposite to the direction of the thermal distortion by the displacement amount S from the position of the frame member 13B as a reference. That is, the frame member is elastically deformed to a position where the gap width is $\delta c$ (the frame member 13D indicated by a thick broken line).

Final-welding is conducted while the frame member is kept in that position where the gap width is $\delta c$. Upon removal of the bending load F after the final-welding, the frame member 13D lies in the position of the frame member 13A together with the bracket 15 united therewith.

As described above, even when the frame member 13 has a deviation from a design shape, the shape-deviation detection unit 41 shown in FIG. 4 compares a detected gap width with the design value to determine a shape deviation and the displacement setting unit 39 calculates an amount of elastic displacement in accordance with the shape deviation. Thus, after the final-welding, a frame structure 11 is obtained in which the frame member 13 is in the position of the frame member 13A.

Other Configuration Examples

The number of portions of the frame member 13 to which a bracket 15 is connected is not limited to one and may be plural.

Figure 18:
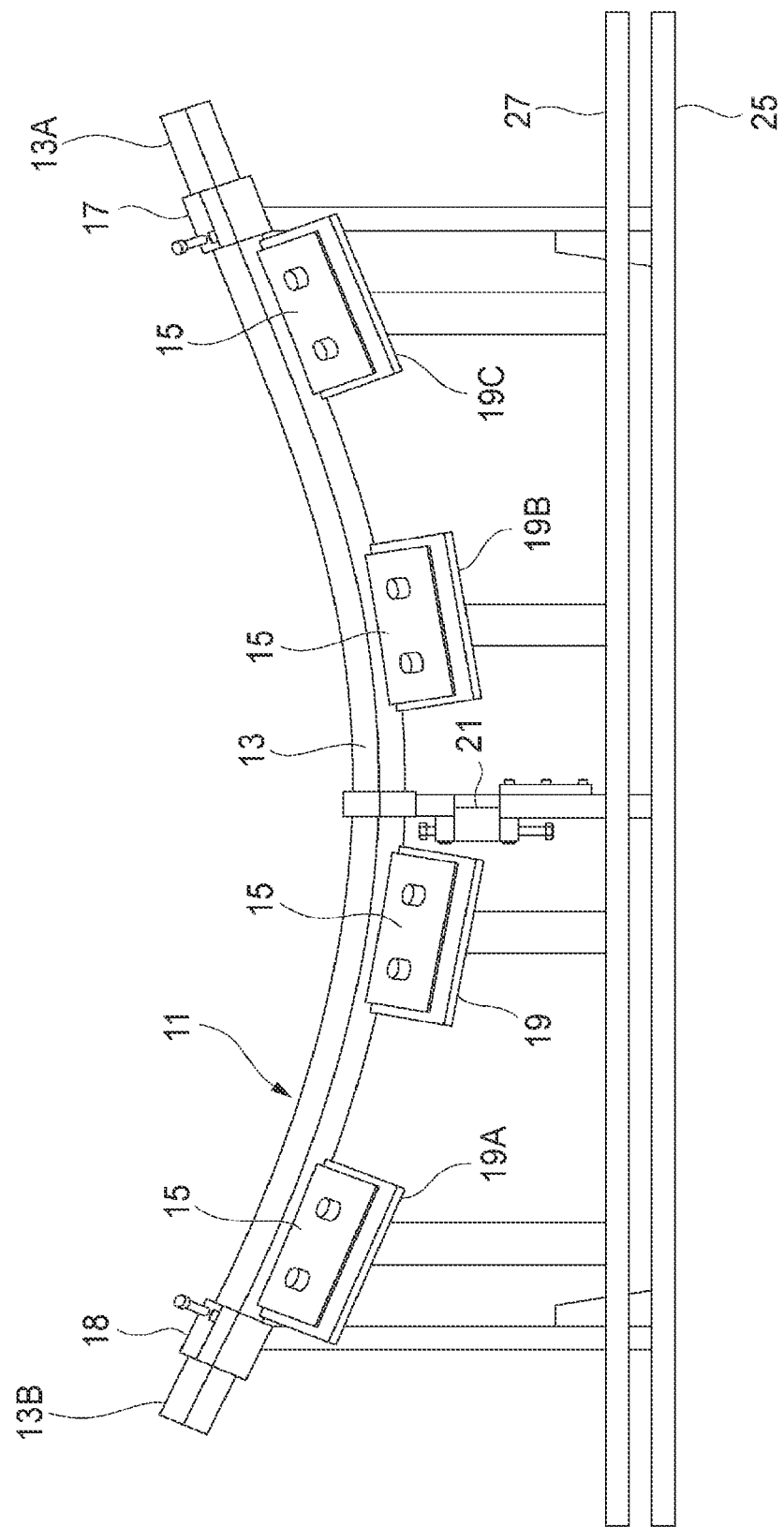
FIG. 18 is a diagrammatic view illustrating the configuration of important portions of a device for producing a frame member including a hollow member and brackets provided to a plurality of portions of the hollow member.

FIG. 18 is a diagrammatic view illustrating the configuration of important portions of a device 200 for producing a frame structure 11A including a hollow member and brackets 15 provided to a plurality of portions thereof.

In the production device 200, a plurality of stands 19, 19A, 19B, and 19C have been disposed between a supporting part 17A and a supporting part 17B. Brackets 15 are disposed respectively on the stands 19, 19A, 19B, and 19C, and the brackets 15 are connected to a frame member 13. With respect to the bracket 15 among the plurality of brackets 15 which is on the stand 19 nearest to a frame-bending part 21, final-welding is conducted while the frame member 13 is being elastically deformed in the manner described above. With respect to the other stands 19A, 19B, and 19C, final-welding is conducted without the elastic deformation of the frame member 13.

By correcting the shape of the frame member 13 only when the bracket 15 nearest to the frame-bending part 21 is final-welded, a frame structure 11A having a shape as designed can be obtained.

The frame member 13 may have a plurality of curved portions.

Figure 19:
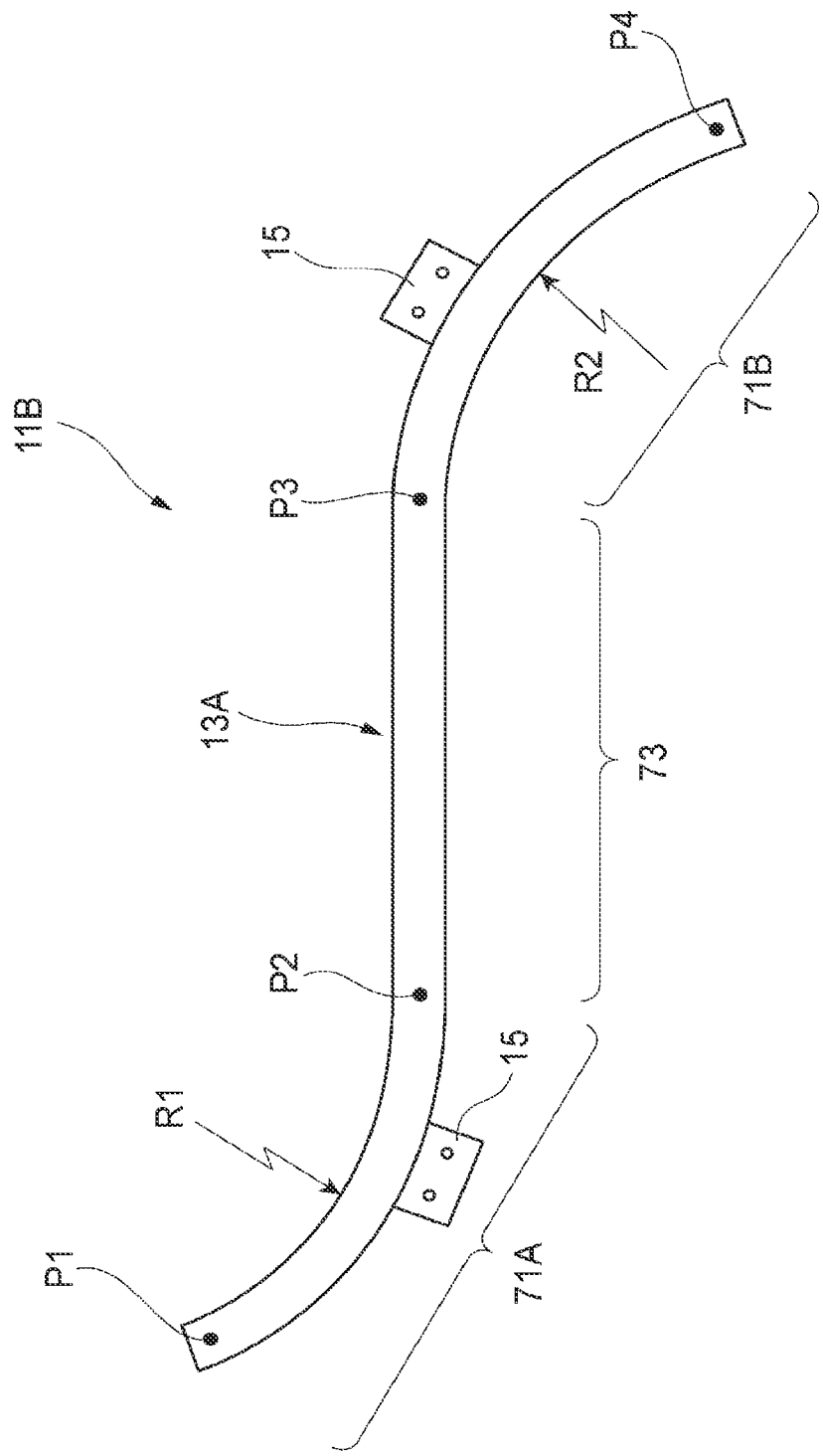
FIG. 19 is a diagrammatic view showing a frame structure employing a frame member having a plurality of curved portions.

FIG. 19 is a diagrammatic view showing a frame structure 11B employing a frame member 13A having a plurality of curved portions.

The frame member 13A has: curved portions 71A and 71B, which are end portions of the member, disposed respectively in the range of from position P1 to position P2 and in the range of from position P3 to position P4; and a linear portion 73 disposed in the range of from position P2 to position P3, between the curved portions 71A and 71B. Brackets 15 have been joined respectively to the curved portions 71A and 71B.

The radii of curvature R1 and R2 of the curved portions 71A and 71B may be the same or different. The frame member 13A shown here as an example has the shape of the letter S in which the curved portions 71A and 71B differ from each other in the direction of curvature. However, the curved portions may differ in the direction of curvature. Furthermore, use may be made of a frame member having another shape, e.g., the shape of the letter Z including a plurality of linear portions combined with a plurality of curved portions.

In the case of the frame structure 11B shown in FIG. 19, brackets 15 are joined to the frame member 13A in the following manner. The curved portion 71A is supported at position P1 and position P2 and a bending load is imposed to between positions P1 and P2, thereby giving an amount of elastic displacement due to bending to the curved portion 71A. Meanwhile, the curved portion 71B is supported at position P3 and position P4 and a bending load is imposed to between positions P3 and P4, thereby giving an amount of elastic displacement due to bending to the curved portion 71B. In this manner, a frame structure 11B is obtained in which brackets 15 have been joined as designed to the frame member 13B having a plurality of curved portions 71A and 71B. The number of curved portions may be three of more, and in this case also, a frame structure as designed is obtained by giving an amount of elastic displacement to each curved portion in the same manner.

The frame members are not limited to ones which have been curved beforehand, and may be linear members.

Also in the case where a linear frame member is subjected to bending and bracket welding, a frame structure can be produced by the procedure described above.

The present invention is not limited to the embodiments described above. Combining configurations of the embodiments or modifying or applying any of the embodiments by a person skilled in the art on the basis of this description and a known technique is predicted from the present invention and is included in the claimed range.

For example, although brackets were used as an example of the connecting members in the explanations, the connecting members are not limited to brackets and may be structural members, e.g., other frames, or components, functional members, etc. to be joined to the frame member.

As described above, this description discloses the following matters.

(1) A method for producing a frame structure, the method including
supporting both ends of a long frame member,
temporarily fixing a connecting member to somewhere along a longitudinal direction of the frame member, and
final-welding the connecting member to the frame member while keeping the frame member in an elastically deformed state by imposing a bending load on a longitudinal-direction intermediate portion of the frame member.

In this method for producing a frame structure, since final-welding is conducted while a frame member to which a connecting member has been temporarily fixed is kept in an elastically deformed state, it is possible to inhibit a thermal distortion during the final-welding from remaining in the frame member and to make the frame structure have a shape close to a design shape.

(2) The method for producing a frame structure according to (1) wherein the connecting member is temporarily fixed so as to form a gap between the connecting member and the frame member.

In this method for producing a frame structure, a displacement due to the thermal distortion is absorbed by the gap and a high degree of shape accuracy is obtained.

(3) The method for producing a frame structure according to (2) wherein a heat input for the final-welding is determined in accordance with the size of the gap.

In this method for producing a frame structure, the connecting member can be fixed without fail by performing final-welding according to the size of the gap.

(4) The method for producing a frame structure according to (3) wherein an amount of the elastic deformation of the frame member is set so that a thermal distortion which is to arise between the frame member and the connecting member by the heat input for the final-welding is countervailed.

In this method for producing a frame structure, since the frame member is elastically deformed so that the thermal distortion to be caused by the final-welding is countervailed and the final-welding is then conducted while the frame member is kept in that state, it is possible to inhibit the thermal distortion from affecting the shape accuracy.

(5) The method for producing a frame structure according to (4) wherein the amount of the elastic deformation of the frame member is set so that a deviation from a design shape of the frame member is countervailed thereby.

In this method for producing a frame structure, even when the frame member has a shape deviation from a design shape, this deviation can be countervailed through the final-welding.

(6) The method for producing a frame structure according to any one of (1) to (5) wherein the frame member is a bent member which has been curved beforehand.

In this method for producing a frame structure, a connecting member can be joined to the bent member to form a shape as designed.

(7) The method for producing a frame structure according to any one of (1) to (6) wherein the frame member is a bent member having a plurality of curved portions.

In this method for producing a frame structure, connecting members can be joined even to a bent member having a plurality of curved portions to form a shape as designed.

(8) The method for producing a frame structure according to any one of (1) to (7) wherein the frame member is a hollow member.

In this method for producing a frame structure, a high-strength frame structure having a reduced weight is obtained.

(9) The method for producing a frame structure according to (8) wherein the frame member has a quadrilateral cross-section perpendicular to the axial direction and the bending load is imposed in the direction of one diagonal of the quadrilateral.

In this method for producing a frame structure, the faces of the frame member can be prevented from being partly pressed and a local cross-sectional deformation can be prevented.

(10) The method for producing a frame structure according to any one of (1) to (9) wherein the bending load is imposed on the frame member at a temperature which is in a warm-forming temperature range and to which the frame member is heated by the final-welding.

In this method for producing a frame structure, the frame member can be made to have a fixed shape by warm forming and, hence, a finished shape closer to a design shape is obtained.

(11) The method for producing a frame structure according to (10) wherein the frame member and the connecting member are each made of a heat treatment type aluminum alloy and the warm-forming temperature is 170° C. or higher.

In this method for producing a frame structure, the materials come to have a reduced proof stress and to be inhibited from increasing in elongation, and the shape-fixing effect of warm forming is enhanced.

(12) The method for producing a frame structure according to any one of (1) to (11) wherein the final-welding is conducted at a side where the bending load is imposed to the frame member as viewed from a position where the connecting member has been temporarily fixed.

In this method for producing a frame structure, since final-welding is conducted in a position nearer to a portion of the frame member which shows a maximum displacement amount, the position where the bending load is imposed can be included, even with a low heat input, in a warm-forming region where the frame member is heated to or above warm-forming temperatures.

(13) The method for producing a frame structure according to any one of (1) to (12) wherein the connecting member is further provided to at least one end of the frame member.

In this method for producing a frame structure, the frame structure can be configured so as to include a plurality of connecting members.

(14) A device for producing a frame structure, the device including
- both-ends-supporting parts for supporting both ends of a long frame member,
- a stand for disposing thereon a connecting member somewhere along a longitudinal direction of the frame member so that the connecting member faces the frame member and for temporarily fixing the connecting member to the frame member,
- a frame-bending part which imposes a bending load on an intermediate portion along the longitudinal direction of the frame member to elastically deform the frame member, and
- a welding part which final-welds the temporarily fixed connecting member to the frame member.

With this device for producing a frame structure, a thermal distortion during final-welding can be inhibited from remaining in the frame member by conducting the final-welding while the frame member to which a connecting member has been temporarily fixed is kept in an elastically deformed state. The frame structure can hence have a shape close to a design shape.

(15) The device for producing a frame structure according to (14) which contains
- a gap detection part which detects a gap between the connecting member and the frame member,
- a heat-input determination unit which determines a heat input for the final-welding in accordance with a size of the detected gap,
- a thermal-distortion prediction unit which predicts a thermal distortion occurring, due to the heat input, between the frame member and the connecting member, and
- a displacement setting unit which sets an amount of elastic displacement of the frame member so that the frame member undergoes a displacement in a direction and an amount which countervail the thermal distortion.

With this device for producing a frame structure, the thermal distortion to be caused by final-welding can be inhibited from affecting shape accuracy by elastically deforming the frame member so that the thermal distortion is countervailed and conducting the final-welding while keeping the frame member in that state.

(16) The device for producing a frame structure according to (15) which further contains a shape-deviation detection unit that determines a deviation from a design shape of the frame member along the direction of imposing the bending load and in which the displacement setting unit sets the amount of elastic displacement of the frame member so that the frame member undergoes a displacement in a direction and an amount which countervail both the thermal distortion and the deviation.

With this device for producing a frame structure, even when the frame member has a shape deviation from a design shape, this deviation can be countervailed through the final-welding.

This application is based on a Japanese patent application filed on Oct. 15, 2021 (Application No. 2021-169697), the contents thereof being incorporated herein by reference.

REFERENCE SIGNS LIST 11, 11A: Frame structure
13: Frame member
13a, 13b: End
15: Bracket (connecting member)
15a: Through hole
15b: Opposed edge
17A, 17B: Supporting part
19: Stand
19a: Fixing part
19b: Leg
20: Through hole
21: Frame-bending part
23: Welding part
25: Lower base plate
27: Upper base plate
27a, 27b, 27c: Opening
29: Raising/lowering drive part
31: Gap detection part
33: Control unit
35: Heat-input determination unit
37: Thermal-distortion prediction unit
39: Displacement setting unit
41: Shape-deviation detection unit
43: Gripping part
43a: Lower supporting part
43b: Upper supporting part
45: Supporting mechanism
45a: fixed part
45b: Sliding part
47: driving part
49: Pin
51: Clamp
53: Base portion
55: Temporary fixing part
57: Weld
59: Final-weld
61: Captured image
63: Edge portion
71A, 71B: Curved portion
73: Linear portion
100: Device for producing frame structure

The invention claimed is:

1. A method for producing a frame structure, the method comprising:
   supporting both ends of a long frame member,
   temporarily fixing a connecting member to somewhere along a longitudinal direction of the frame member, and
   final-welding the connecting member to the frame member while keeping the frame member in an elastically deformed state by imposing a bending load on an intermediate portion along the longitudinal direction of the frame member,
   wherein the connecting member is temporarily fixed so as to form a gap between the connecting member and the frame member.

2. The method for producing a frame structure according to claim 1, wherein a heat input for the final-welding is determined in accordance with a size of the gap.

3. The method for producing a frame structure according to claim 2, wherein an amount of the elastic deformation of the frame member is set so that a thermal distortion which is to arise between the frame member and the connecting member by the heat input for the final-welding is countervailed.

4. The method for producing a frame structure according to claim 3, wherein the amount of the elastic deformation of the frame member is set so that a deviation from a design shape of the frame member is countervailed.

5. The method for producing a frame structure according to claim 4, wherein the final-welding is conducted between a position where the connecting member has been temporarily fixed and a part where the frame member is deformed with the bending load.

6. The method for producing a frame structure according to claim 3, wherein the final-welding is conducted between a position where the connecting member has been temporarily fixed and a part where the frame member is deformed with the bending load.

7. The method for producing a frame structure according to claim 2, wherein the final-welding is conducted between a position where the connecting member has been temporarily fixed and a part where the frame member is deformed with the bending load.

8. The method for producing a frame structure according to claim 1, wherein the frame member is a hollow member.

9. The method for producing a frame structure according to claim 8, wherein the frame member has a quadrilateral cross-section perpendicular to an axial direction and the bending load is imposed in a direction of one diagonal of the quadrilateral.

10. The method for producing a frame structure according to claim 1, wherein the bending load is imposed on the frame member at a temperature which is in a warm-forming temperature range and to which the frame member is heated by the final-welding.

11. The method for producing a frame structure according to claim 10, wherein the frame member and the connecting member are each made of a heat treatment type aluminum alloy and the warm-forming temperature is 170° C. or higher.

12. The method for producing a frame structure according to claim 1, wherein the frame member is a bent member which has been curved beforehand.

13. The method for producing a frame structure according to claim 1, wherein the frame member is a bent member having a plurality of curved portions.

14. The method for producing a frame structure according to claim 1, wherein the final-welding is conducted between a position where the connecting member has been temporarily fixed and a part where the frame member is deformed with the bending load.

15. The method for producing a frame structure according to claim 1, wherein the connecting member is further provided to at least one end of the frame member.

16. A device for producing a frame structure by the method of claim 1, the device comprising
both-ends-supporting parts for supporting both ends of a long frame member,
a stand for disposing thereon a connecting member somewhere along a longitudinal direction of the frame member so that the connecting member faces the frame member and for temporarily fixing the connecting member to the frame member,
a frame-bending part which imposes a bending load on an intermediate portion along the longitudinal-direction of the frame member to elastically deform the frame member, and
a welding part which final-welds the temporarily fixed connecting member to the frame member so as to form a gap between the connecting member and the frame member.

17. The device for producing a frame structure according to claim 16, the device comprising
a gap detection part which detects the gap between the connecting member and the frame member,
a heat-input determination unit which determines a heat input for the final- welding in accordance with a size of the detected gap,
a thermal-distortion prediction unit which predicts a thermal distortion occurring, due to the heat input, between the frame member and the connecting member, and
a displacement setting unit which sets an amount of elastic displacement of the frame member so that the frame member undergoes a displacement in a direction and an amount which countervail the thermal distortion.

18. The device for producing a frame structure according to claim 17, the device comprising a shape-deviation detection unit that determines a deviation from a design shape of the frame member along a direction of imposing the bending load and in which the displacement setting unit sets the amount of elastic displacement of the frame member so that the frame member undergoes a displacement in a direction and an amount which countervail both the thermal distortion and the deviation.

* * * * *